(12) United States Patent
Tanaka et al.

(10) Patent No.: US 7,898,923 B2
(45) Date of Patent: Mar. 1, 2011

(54) OPTICAL PICKUP DEVICE WITH HEAT RADIATION PART, AND OPTICAL DISC APPARATUS INCLUDING THE OPTICAL PICKUP DEVICE

(75) Inventors: Toshiyasu Tanaka, Osaka (JP); Yoshiaki Komma, Osaka (JP); Kousei Sano, Osaka (JP); Hidenori Wada, Kyoto (JP); Keiichi Matsuzaki, Osaka (JP); Kanji Wakabayashi, Kyoto (JP)

(73) Assignee: Panasonic Corporation, Osaka (JP)

( * ) Notice: Subject to any disclaimer, the term of this patent is extended or adjusted under 35 U.S.C. 154(b) by 254 days.

(21) Appl. No.: 12/280,588

(22) PCT Filed: Feb. 27, 2007

(86) PCT No.: PCT/JP2007/053626
§ 371 (c)(1),
(2), (4) Date: Aug. 25, 2008

(87) PCT Pub. No.: WO2007/099946
PCT Pub. Date: Sep. 7, 2007

(65) Prior Publication Data
US 2009/0034403 A1    Feb. 5, 2009

(30) Foreign Application Priority Data
Feb. 28, 2006   (JP) ................. 2006-052726

(51) Int. Cl.
*G11B 7/00* (2006.01)
(52) U.S. Cl. ........................ 369/100; 369/121
(58) Field of Classification Search .......... None
See application file for complete search history.

(56) References Cited

U.S. PATENT DOCUMENTS
5,600,619 A    2/1997   Takekoshi et al.

FOREIGN PATENT DOCUMENTS

| JP | 4-28464 | 3/1992 |
|----|---------|--------|
| JP | 8-287501 | 11/1996 |
| JP | 10-83551 | 3/1998 |
| JP | 2002-197708 | 7/2002 |
| JP | 2004-5823 | 1/2004 |
| JP | 2005-78778 | 3/2005 |
| JP | 2005-196860 | 7/2005 |
| JP | 2005-353120 | 12/2005 |
| JP | 2006-54343 | 2/2006 |
| WO | 95/09418 | 4/1995 |

OTHER PUBLICATIONS

International Search Report issued Jun. 5, 2007 in the International (PCT) Application of which the present application is the U.S. National Stage. International Preliminary Report on Patentability issued Sep. 2, 2008 in the International (PCT) Application of which the present application is the U.S. National Stage.
Written Opinion of the International Searching Authority issued Sep. 2, 2008 in the International (PCT) Application of which the present application is the U.S. National Stage.

*Primary Examiner* — Paul Huber
(74) *Attorney, Agent, or Firm* — Wenderoth, Lind & Ponack, L.L.P.

(57) ABSTRACT

An optical pickup device which can improve heat radiation efficiency and an optical disk apparatus including the optical pickup device are provided. The optical pickup device having a base (110), a laser unit (141), an optical system (140) which propagates a laser beam, and an adjusting member (142) includes a heat radiation part (146) which is fixed to a heat radiation surface (141b) of the laser unit and which conducts heat from the heat radiation surface to the adjusting member. Therefore, heat generated by the laser unit is transmitted to the adjusting member and then the base through the heat radiation part to make it possible to efficiently perform heat removal for the laser unit.

5 Claims, 23 Drawing Sheets

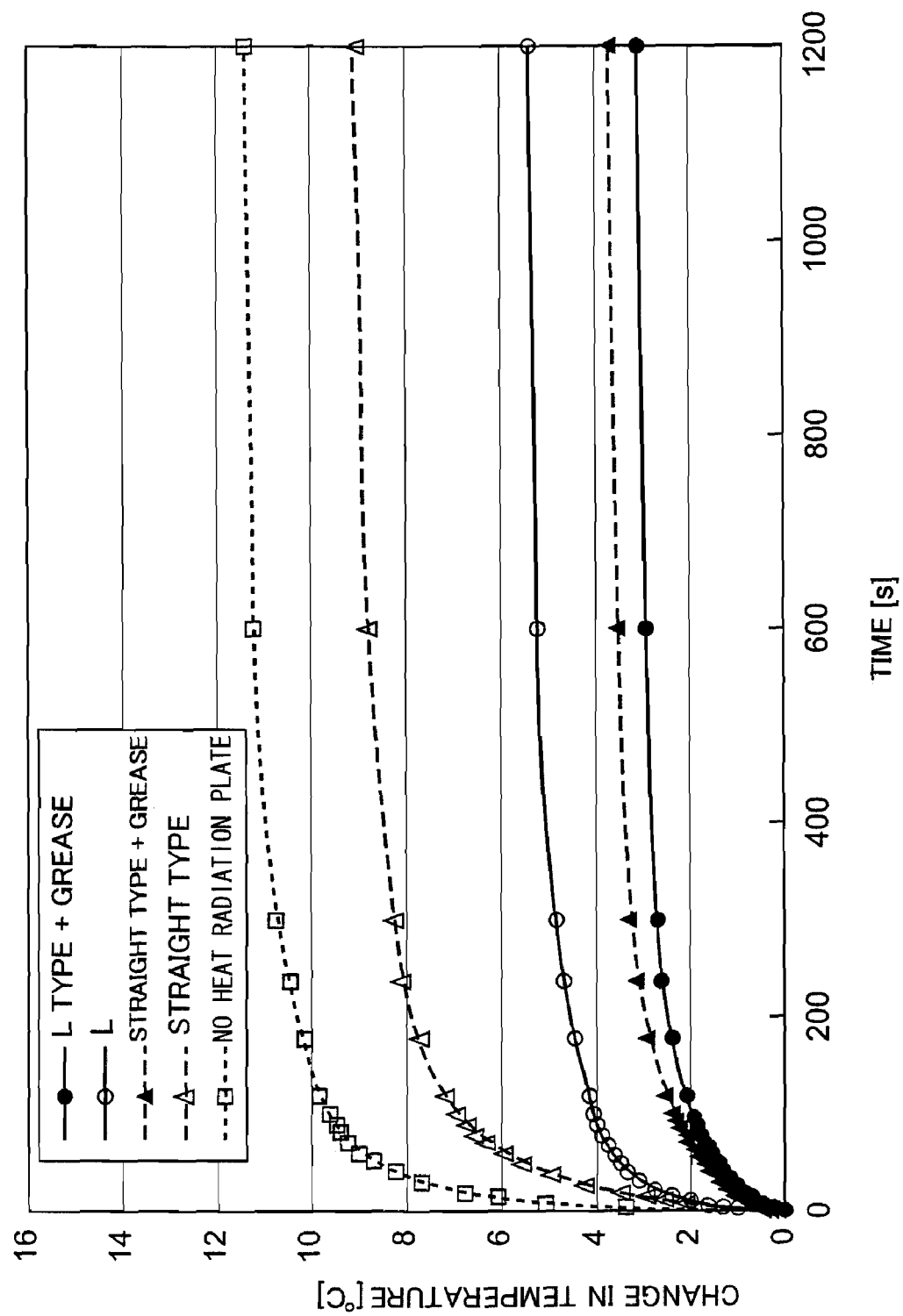

OPTICAL PICKUP DEVICE WITH HEAT RADIATION PART, AND OPTICAL DISC APPARATUS INCLUDING THE OPTICAL PICKUP DEVICE

BACKGROUND OF THE INVENTION

1. Technical Field

The present invention relates to an optical disk apparatus which records and reproduces information on/from an optical disk such as a CD (compact disk) or a DVD (digital versatile disk), and an optical pickup device included in the optical disk apparatus.

2. Background Art

An optical disk apparatus which is generally used to record or reproduce information on/from an optical disk such as a CD or a DVD is shown in FIG. 14. In FIG. 14, an optical disk apparatus 1 has a housing 2 and a tray 3 which is held by the housing 2 such that the tray 3 can go in and out of the housing 2. The housing 2 has a pouched shape obtained by combining metal housing portions 2a and 2b, and the housing 2 is designed such that the tray 3 is inserted or removed in/from an opening of the housing 2. An optical pickup device 4 is attached to the tray 3 from a rear surface side of the tray 3. Rails 3a are slidably arranged on both side portions of the tray 3. The rails 3a are held by rail holding portions 3b integrally arranged on the tray 3.

The optical pickup device 4 has at least a spindle motor 5 which rotationally drives the optical disk, a metal cover 6 having an opening 6a extending from the spindle motor 5 to the outer circumference, and a carriage 7 partially exposed from the opening 6a. The carriage 7 is movably held by a plurality of guide shafts arranged on the optical pickup device 4. Furthermore, the carriage 7 can be moved by a feed motor (not shown) such that the carriage 7 approaches or leaves the spindle motor 5. Reference numeral 8 denotes a bezel arranged in front of the tray 3. The bezel 8 is designed to be large enough to fit the opening of the housing 2.

In the carriage 7, a light source such as a high-output laser diode, various optical members, an objective lens which forms an optical spot on an optical disk, and the like are mounted. When performing information recording on the optical disk, the high-output light source, an IC which drives the light source, and the like are necessary. As a result, lots of heat is generated by the light source and the IC and influences recording/reproducing characteristics.

In an optical pickup device for the CD or the DVD, in general, a light-receiving/emitting unit obtained by integrally arranging a light source portion such as a semiconductor laser and a light-receiving portion such as a photodetector is used. Since a quantity of heat generated by the light source portion in the light-receiving/emitting unit is large, heat must be removed from the light-receiving/emitting unit. On the other hand, since the light-receiving/emitting unit is molded with a resin material, it cannot be said that the light-receiving/emitting unit itself has a good heat radiation property. Therefore, heat radiation from the light-receiving/emitting unit must be considered.

Since a light-receiving/emitting unit included in an optical disk apparatus for CD is supported and fixed to a metal base configuring the carriage, heat generated by the light-receiving/emitting unit for CD can be directly conducted to the base (for example, see Japanese Unexamined Patent Publication No. 10-83551). Therefore, the heat radiation property of the CD light-receiving/emitting unit is relatively preferable.

On the other hand, since information is recorded on the DVD at a density higher than that of the CD, in an optical pickup device for DVD, slide adjustment and tilt adjustment must be performed in the light-receiving/emitting unit. In this case, the slide adjustment is adjustment to adjust an optical axis of an optical system having a collimating lens, an objective lens and the like. In this adjustment, on a plane (X-Y plane) parallel to a radiation reference plane of a laser beam in the DVD light-receiving/emitting unit, the DVD light-receiving/emitting unit is moved to correct the optical axis. The tilt adjustment is adjustment to correct an inclination of a light-emitting angle of the laser beam from a laser beam source.

Therefore, in the optical pickup device for DVD, the light-receiving/emitting unit must be able to be moved with respect to the base for the adjustment. For this reason, the light-receiving/emitting unit cannot be directly supported and fixed to the metal base configuring the carriage. Therefore, heat radiation from the DVD light-receiving/emitting unit poses a problem. For this reason, a plurality of approaches to solve the problem are made. Upon completion of the adjustment, the light-receiving/emitting unit is fixed to the base.

For example, in Japanese Unexamined Patent Publication No. 2005-196860, a configuration as shown in FIGS. 15 to 17 is disclosed. In this case, FIG. 16 is a diagram of an optical pickup when viewed from the lower surface side, and FIG. 17 is a diagram of the optical pickup when viewed from the upper surface side in a state that the lower surface and the upper surface of the optical pickup shown in FIG. 16 are upside-down. FIG. 15 is a perspective view of the optical pickup device 4 on which the carriage 7 is mounted in a state shown in FIG. 17. In the configuration in FIGS. 16 and 17, reference numeral 11 denotes a metal base, reference numeral 13 denotes a CD light-receiving/emitting unit, reference numeral 14 denotes a DVD light-receiving/emitting unit, reference numeral 15 denotes a tilt adjusting member, reference numeral 16 denotes a slide adjusting member, and reference numeral 21 denotes a heat radiation fin.

In the configuration shown in FIGS. 16 and 17, a first heat radiating sheet 17 and a heat radiating base 18 are sequentially attached to a side opposing the light-emitting surface of the DVD light-receiving/emitting unit 14 in the order of the sheet 17 and the base 18 from the DVD light-receiving/emitting unit 14 side. The first heat radiating sheet 17 and the heat radiating base 18 are pressed against the DVD light-receiving/emitting unit 14 by a press spring 19 and supported. Therefore, the first heat radiating sheet 17 is brought into contact with a surface opposing the light-emitting surface of the DVD light-receiving/emitting unit 14. In this manner, the press spring 19 is used to bring the first heat radiating sheet 17 into contact with the DVD light-receiving/emitting unit 14 to provide heat radiation and to make it possible to perform the slide adjustment and the tilt adjustment for the DVD light-receiving/emitting unit 14.

Furthermore, a second heat radiating sheet 20 is attached to cover the lower surfaces of the DVD light-receiving/emitting unit 14 and the tilt adjusting member 15. The lower surface mentioned here corresponds to an upper surface when viewed in FIG. 16. The second heat radiating sheet 20 is to efficiently conduct heat generated by the DVD laser unit 14 to the base 11 having a large heat capacity through the tilt adjusting member 15, and the second heat radiating sheet 20 is formed by a material such as graphite which is excellent in heat radiation property. In order to make it possible to perform slide adjustment and tilt adjustment for the DVD light-receiving/emitting unit 14, the second heat radiating sheet 20 is not in direct contact with the DVD light-receiving/emitting unit 14.

Even in the conventional configuration shown in FIGS. 15 to 17, the DVD light-receiving/emitting unit provides heat radiation which is sufficient to operate the optical pickup device including the slide adjusting member and the tilt adjusting member in the DVD light-receiving/emitting unit.

However, as described above, the first heat radiating sheet 17 is just pressed by the press spring 19 to be in contact with the DVD light-receiving/emitting unit 14 to secure the heat radiation capability. The second heat radiating sheet 20 is merely attached to cover the lower surfaces of the DVD light-receiving/emitting unit 14 and the tilt adjusting member 15. At this time, a medium such as grease to improve heat conductivity from the DVD light-receiving/emitting unit 14 to the tilt adjusting member 15 may be provided between the heat radiating sheet 20 and the lower surfaces of the DVD light-receiving/emitting unit 14 and the tilt adjusting member 15. However, it is not said that the medium has sufficient heat conductivity.

Therefore, a margin to further improve the heat radiation property of the DVD light-receiving/emitting unit is still present.

SUMMARY OF THE INVENTION

Accordingly, the present invention has as its object to provide an optical pickup device which can further improve heat radiation efficiency and an optical disk apparatus including the optical pickup device.

In order to achieve the object, the present invention has the following configuration.

More specifically, according to a first aspect of the present invention, there is provided an optical pickup device which has: a base; a laser unit having a laser beam source arranged on the base; an optical system which is disposed on the base and propagates a laser beam between the laser unit and an optical disk; and an adjusting member which is disposed between the base and the laser unit, is configured to support the laser unit movably in fine movement with respect to the base, and is configured to adjust the laser beam radiated from the laser unit to the optical disk, the device further comprising a heat radiation part configured to come in direct contact with a heat radiation surface facing a laser beam radiation surface of the laser unit and the adjusting member, and configured to conduct heat from the heat radiation surface to the adjusting member.

The optical pickup device may be designed so that the heat radiation part is L-shaped, and has a first-end portion configured to be fixed to the heat radiation surface and a second-end portion configured to come in contact with the adjusting member.

The optical pickup device may be designed so that the optical system has an objective lens configured to focus the laser beam on the optical disk, the adjusting member has a slide adjusting member configured to make the laser unit movable to adjust an optical axis of the optical system and a tilt adjusting member configured to perform tilt adjustment, and the heat radiation part comes in direct contact with the tilt adjusting member.

The heat radiation part may be molded integrally with the tilt adjusting member.

The optical pickup device may be designed so that the base, the heat radiation part, and the adjusting member are made of metal.

An optical disk apparatus according to the second aspect of the present invention comprises:

an optical pickup device which has: a base; a laser unit having a laser beam source arranged on the base; an optical system which is disposed on the base and propagates a laser beam between the laser unit and an optical disk; an adjusting member which is disposed between the base and the laser unit, is configured to support the laser unit movably in fine movement with respect to the base, and is configured to adjust the laser beam radiated from the laser unit to the optical disk; and a heat radiation part configured to come in direct contact with a heat radiation surface facing a laser beam radiation surface of the laser unit and the adjusting member, and configured to conduct heat from the heat radiation surface to the adjusting member; and a control circuit to which a signal obtained from the optical pickup device is supplied and configured to perform rotational control of the optical disk and focusing and tracking control of an optical lens on a basis of the signal.

Furthermore, an optical pickup device according to a third aspect of the present invention comprises:

a base;

a laser unit which has a laser beam source configured to emit a laser beam from a laser beam radiation surface to the inside of the base and configured to be arranged on the base such that a heat radiation surface facing the laser beam radiation surface is directed to the outside of the base;

a heat radiation fixing member which is a member configured to fix the laser unit to the base and configured to conduct heat from the heat radiation surface to the base, and which has a heat radiation surface fixing portion configured to be fixed to the heat radiation surface and a base fixing portion configured to be bent with respect to the heat radiation surface fixing portion in an optical axis direction of the laser beam radiated from the laser beam source, extend to the base, and be fixed to the base; and an optical system which is arranged on the base and configured to propagate the laser beam between the laser unit and the optical disk.

According to the optical pickup device of the first aspect, the heat radiation part is directly fixed to a heat radiation surface of the laser unit and performs heat conduction for the adjusting member. Since the adjusting member is directly attached to the base having a large heat capacity, heat conducted to the adjusting member is efficiently radiated to the base. In comparison with conventional indirect heat radiation through the medium such as grease or conventional heat radiation by unreliable connection to the heat radiation surface of the laser unit, in the optical pickup device of the first aspect, the heat radiation part can efficiently perform heat radiation from the laser unit because the heat radiation part is in reliable contact with the heat radiation surface of laser unit and attached to the adjusting member.

When the heat radiation part is a member having an L-shaped section, the laser unit serving as a heat generator can be connected to the adjusting member which radiates heat by the shortest distance, and the heat radiation part can be arranged in a small space. Therefore, the apparatus can be made compact as a whole.

Furthermore, the heat radiation part is brought into contact with the tilt adjusting member configuring the adjusting member, so that the laser unit, the heat radiation part and the tilt adjusting member can be integrally configured, manufacturing of the optical pickup device can be simplified, and the optical pickup device can be made compact.

According to the optical disk apparatus of the second aspect, as described above, there is provided the optical pickup device in which heat radiation efficiency of the laser unit is improved relative to a conventional apparatus. For this reason, an excellent optical apparatus in operation stability can be provided.

Furthermore, according to the optical pickup device of the third aspect, the heat radiation fixing member has the heat radiation surface fixing portion fixed to the heat radiation surface of the laser unit and the base fixing portion bent from the heat radiation surface fixing portion, extending to the base, and fixed to the base. Therefore, the heat radiation fixing member can fix the laser unit to the base and can efficiently conduct heat from the heat radiation surface of laser unit to the base. Since the heat radiation fixing member is shaped to be bent from the heat radiation surface fixing portion and extending to the base, fixing and heat radiation from the laser unit having the heat radiation surface on the back thereof to the base can be performed by a compact configuration.

BRIEF DESCRIPTION OF THE DRAWINGS

FIG. 8A is a perspective view showing an example of a heat radiation part shown in FIG. 1 or the like.

FIG. 9A is a perspective view showing another example of the heat radiation part shown in FIG. 1 or the like.

FIG. 10A is a perspective view showing still another example of the heat radiation part shown in FIG. 1 or the like.

FIG. 10C is a perspective view showing still another example of the heat radiation part shown in FIG. 1 or the like.

FIG. 10E is a perspective view showing still another example of the heat radiation part shown in FIG. 1 or the like.

FIG. 10G is a perspective view showing still another example of the heat radiation part shown in FIG. 1 or the like.

FIG. 10I is a perspective view showing still another example of the heat radiation part shown in FIG. 1 or the like.

FIG. 12 is a graph showing a change in temperature in a configuration in which the heat radiation part shown in FIG. 1 or the like is arranged.

DETAILED DESCRIPTION OF THE INVENTION

Figure 1:
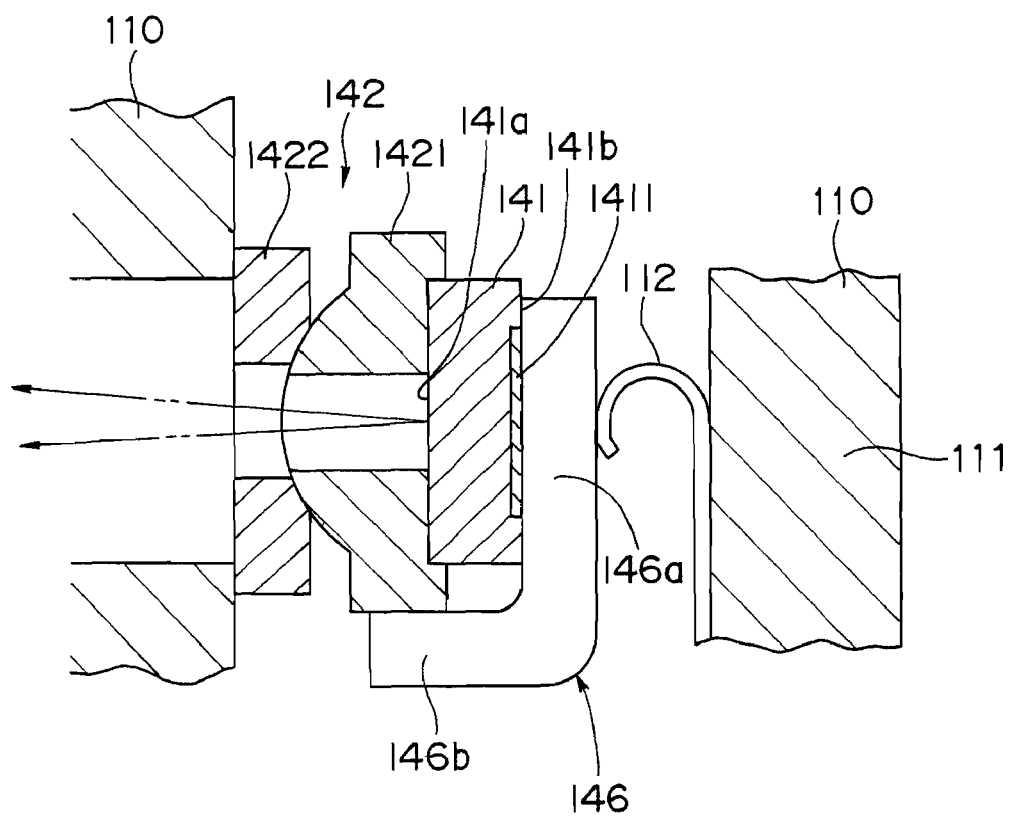
FIG. 1 is a sectional view showing a configuration of a laser unit portion included in an optical pickup device according to an embodiment of the present invention.

An optical pickup device according to an embodiment of the present invention and an optical disk apparatus including the optical pickup device will be described below with reference to the accompanying drawings. In the drawings, the same reference numerals denote the same or similar components.

In the embodiments to be described below, an optical pickup device obtained by integrally forming an optical pickup for BD using a blue laser and an optical pickup for CD and DVD with each other is exemplified. However, the configuration of the optical pickup device is not limited to the above configuration. Optical pickup devices dedicated to a DVD, a CD, and a BD may be used, and an optical pickup device obtained by arbitrarily combining the optical pickup devices of the three types may be used.

Figure 2:
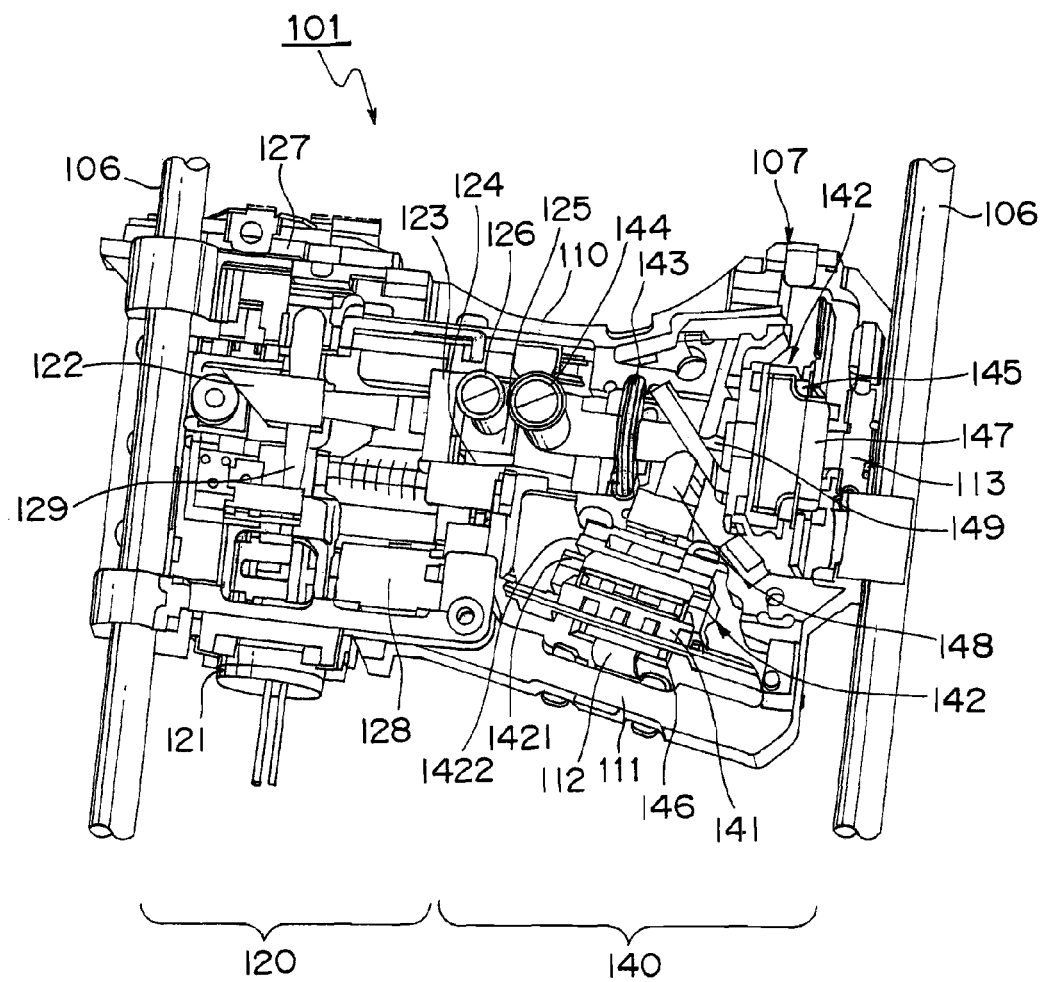
FIG. 2 is a perspective view of a carriage portion of the optical pickup device according to the embodiment of the present invention.
Figure 3:
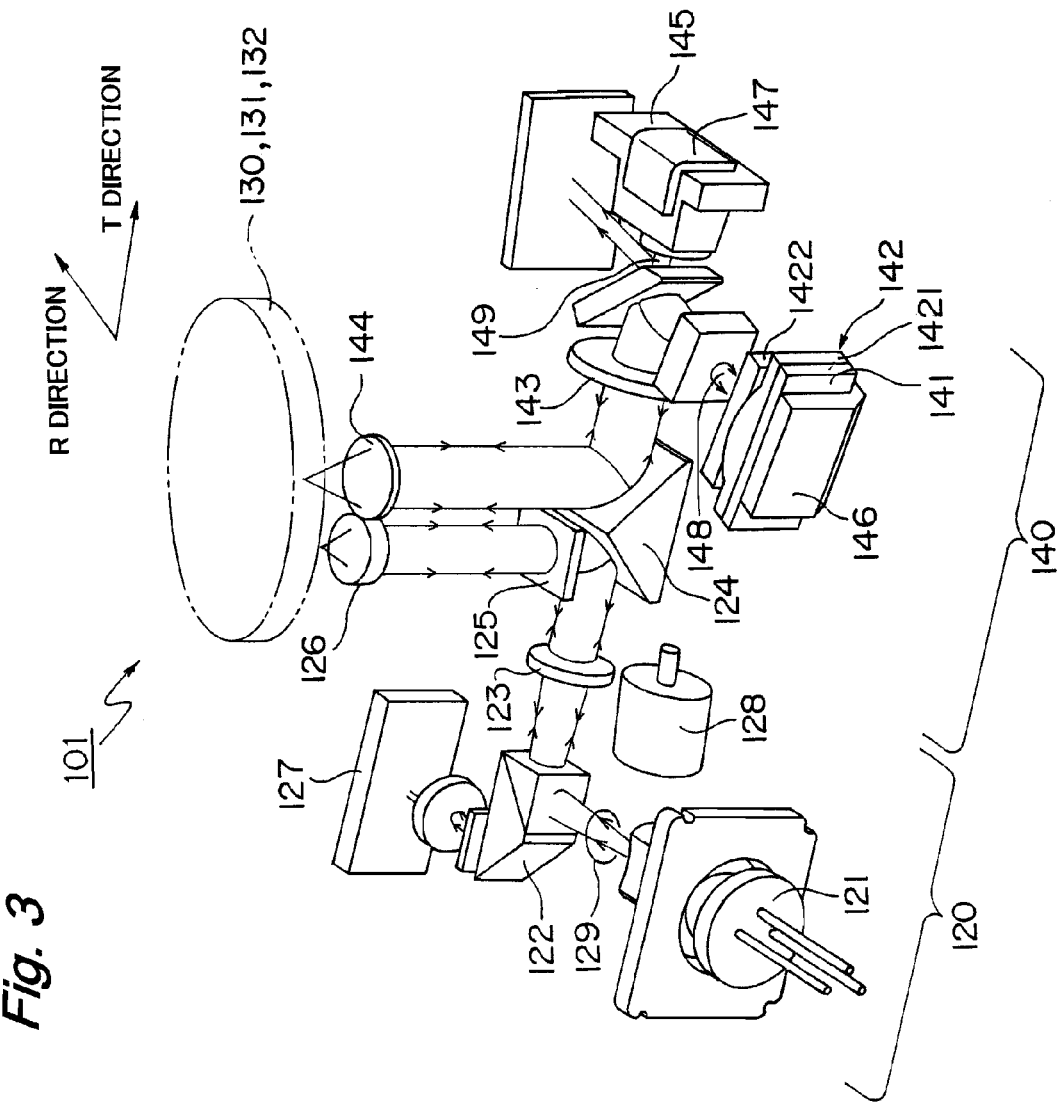
FIG. 3 is a conceptual diagram of an optical system mounted on the carriage portion of the optical pickup device shown in FIG. 2.
Figure 4:
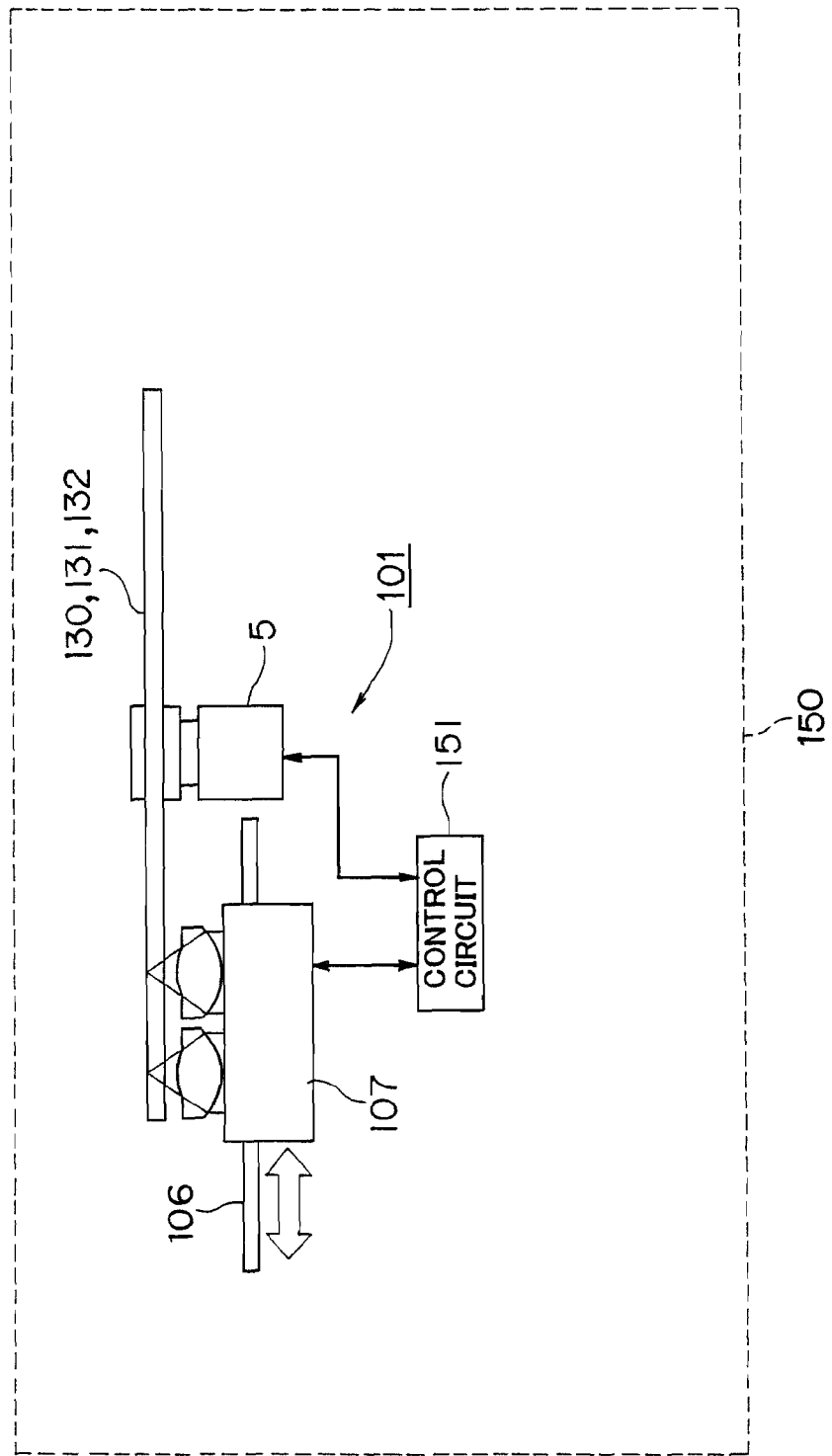
FIG. 4 is a block diagram showing a configuration of an optical disk apparatus including the optical pickup device according to the embodiment of the present invention.
Figure 15:
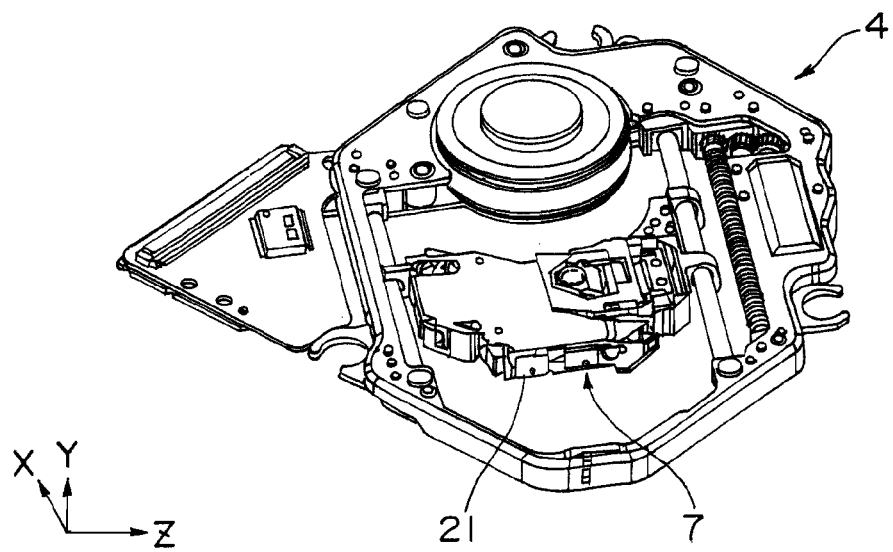
FIG. 15 is a perspective view of an optical pickup device included in the optical disk apparatus shown in FIG. 14.
Figure 16:
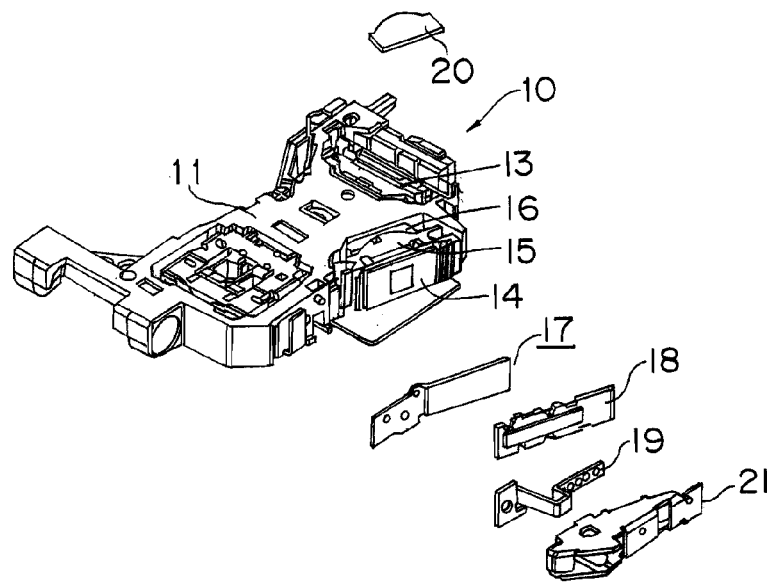
FIG. 16 is a perspective view showing a carriage portion of the optical pickup device shown in FIG. 15 and a view for explaining a member for heat radiation from a laser unit included in the carriage portion.
Figure 17:
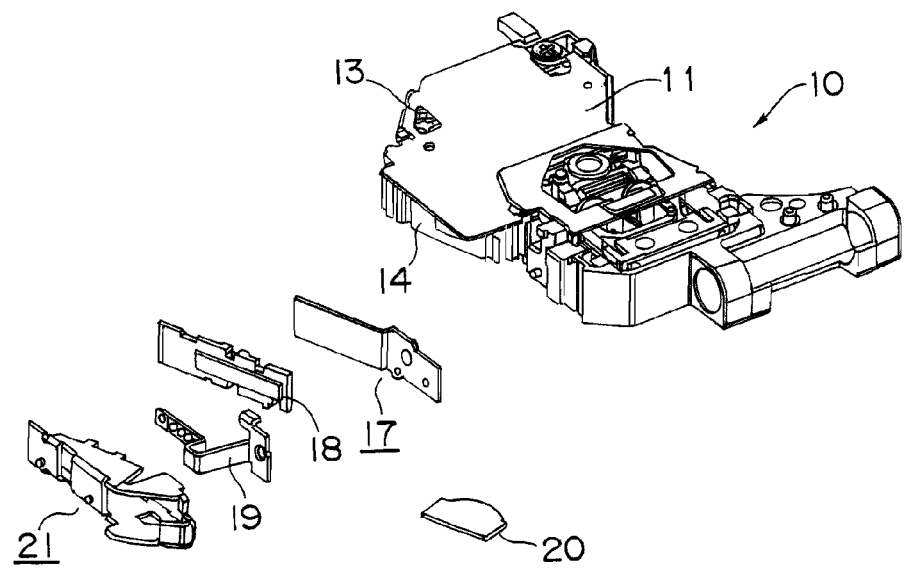
FIG. 17 is a perspective view showing the carriage portion shown in FIG. 16 such that the carriage portion is upside-down.

In FIGS. 2 and 3, a portion of a so-called carriage 107 serving as a main part of the optical pickup device 101 is shown. The optical pickup device 101 also includes, in addition to the carriage 107, a spindle motor which rotationally drives an optical disk, a plurality of guide shafts 106 by which the carriage 107 is movably supported, and the like. The optical pickup device 101 is configured to have an appearance similar to that of the conventional optical pickup device 4 shown in FIG. 15. The optical pickup device 101 configured as described above is included in an optical disk apparatus 150 including the configuration shown in FIG. 4.

FIG. 2 is a perspective view of the carriage 107 when the carriage 107 in the optical pickup device 101 is viewed from an optical disk (not shown) located on an upper part of the paper showing FIG. 2 in almost parallel to the paper. FIG. 3 shows an outline of an optical system configuration related to an optical pickup mounted in the carriage 107. In FIG. 3, for illustrative convenience, a base 110 of the optical pickup device 101 is omitted. As described above, the optical pickup device 101 according to the embodiment is an optical pickup device obtained by integrally forming the optical system configuration for BD and the optical system configuration for CD and DVD.

First, the entire configuration and the operation of the carriage 107 portion of the optical pickup device 101 will be simply described below. A heat radiation part serving as a characteristic configuration portion in the optical pickup device 101 according to the embodiment will be described next.

The carriage 107 has, roughly classified, the base 110 made of metal in the embodiment and supported by the shaft 106, an optical system configuration 120 for BD mounted on the base 110, and an optical system configuration 140 for CD and DVD mounted on the base 110.

The optical system configuration 120 for BD is an optical system configuration which uses a blue laser beam having a wavelength of, for example, 405 nm and an objective lens having an NA (numerical aperture) of 0.85 to achieve a recording density which is five times the recording density of a current DVD.

In FIGS. 2 and 3, the optical system configuration 120 includes a light source 121 having a semiconductor laser element which radiates the blue laser beam, a polarized beam splitter 122, a collimating lens 123, a rising prism 124, a wavelength plate 125, an objective lens 126, a photodetector 127, and the like. Reference numeral 128 denotes a motor to move the collimating lens 123 in the optical axis direction to correct a spherical aberration.

In the optical system configuration 120 for BD, an optical beam 129 radiated from the light source 121 passes through the polarized beam splitter 122 and is converted into parallel beam by the collimating lens 123. The optical axis of the parallel beam is bent at a right angle with respect to an optical disk 130 having a high recording density by the rising prism 124. The objective lens 126 focuses the optical beam on the recording surface of the optical disk 130.

The optical beam reflected on the recording surface of the optical disk 130 tracks back the former optical path and is phase-shifted by the wavelength plate 125, so that the optical beam is separated by a splitting means such as the polarized beam splitter 122 in a direction different from the former direction and guided to the photodetector 127. The photodetector 127 photoelectrically converts the optical beam to generate an information signal, a focus error signal for focus control, and an electric signal to obtain a servo signal of a tracking signal for tracking control.

The optical system configuration 140 for CD and DVD has a DVD optical system which records and reproduces information by a red laser beam having, for example, a wavelength of 680 nm and a CD optical system which records and reproduces information by an infrared laser beam having a wavelength of, for example, 780 nm. The optical system configuration 140 for CD or DVD includes a first laser unit 141, an adjusting member 142, a collimating lens 143, a rising prism 124 (shared with the optical system configuration 120 for BD), an objective lens 144, a second laser unit 145, and the like.

In this case, the first laser unit 141 is an element obtained by integrally forming a light source having a semiconductor laser element which radiates the red laser beam for DVD having the wavelength of, for example, 680 nm and a photodetector which receives the laser beam reflected on the DVD. The second laser unit 145 is an element obtained by integrally forming a light source having a semiconductor laser element which radiates the infrared laser beam for CD having the wavelength of, for example, 780 nm and a photodetector which receives the laser beam reflected on the CD. In the first laser unit 141 and the second laser unit 145, the light sources and the photodetectors are integrally molded with a resin, as shown in FIG. 1, on a heat radiation surface 141b side facing a laser beam radiation surface 141a of each of the first laser unit 141 and the second laser unit 145, a metal heat radiation plate 1411 is attached. The heat radiation plate 1411 also may serve as a common terminal for an electric signal, for example, a ground terminal. In FIG. 1, the configuration in the first laser unit 141 is shown.

In the following description, as shown in FIG. 3, reference numeral 131 denotes an optical disk, i.e., a normal DVD on/from which information is recorded or reproduced with the red laser beam, and reference numeral 132 denotes an optical disk, i.e., a CD on/from which information is recorded or reproduced with the infrared laser beam.

The adjusting member 142 is arranged between the first laser unit 141 and the base 110 and has a tilt adjusting member 1421 attached to the first laser unit 141 and a slide adjusting member 1422 which is attached to the base 110 such that the slide adjusting member 1422 can be slid in a T direction and an R direction with respect to the base 110 and which is in contact with the tilt adjusting member 1421. In the embodiment, both the tilt adjusting member 1421 and the slide adjusting member 1422 are made of a metal.

In this case, the tilt adjusting member 1421 is a member to adjust an inclination of an optical axis from the first laser unit 141. Since the CD 132 has a wide track pitch in comparison with the DVD 131, in the embodiment, the tilt adjusting member 1421 is not included in the second laser unit 145 for CD. On the other hand, since a track pitch on the DVD 131 is narrow, the tilt adjustment is indispensable for the DVD 131 to stably record or reproduce information. The tilt adjustment is also called skew adjustment. The tilt adjusting member 142 may be arranged in the second laser unit 145 for CD, as a matter of course.

The slide adjusting member 1422 is a member which makes the first laser unit 141 movable in the T direction and the R direction in order to adjust the optical axis of the optical system configuration.

The T direction shown in FIG. 3 is a tracking direction which is perpendicular to the optical axis of the objective lens 126 or 144 and is parallel to a track groove directions of the optical disks 130 to 132. The R direction is a radial direction which is perpendicular to the T direction and perpendicular to the track groove directions of the optical disks 130 to 132 at the position of the objective lens 126 or 144.

In the optical system configuration 140 for CD and DVD configured as described above, a degree of parallelization of an optical beam 148 radiated from the light source of the first laser unit 141 is converted by the collimating lens 143 into, for example, the degree of parallelization of almost parallel beam. The converted beam is bent in a direction at a right angle to the optical disk 131 (for example, the DVD) by the rising prism 124. The objective lens 144 focuses the optical beam on the recording surface of the optical disk 131. The optical beam reflected on the recording surface of the optical disk 131 tracks back the former optical path and is separated by a splitter means such as a polarizing hologram in a direction different from the former direction. Then the optical beam is photoelectrically converted by the photodetector included in the first laser unit 141. In the photodetector, an electric signal to obtain an information signal and a servo signal (focus error signal for focus control or tracking signal for tracking control) is generated.

In the optical system configuration 140 for CD and DVD configured as described above, with respect to an optical beam 149 radiated from the light source of the second laser unit 145, the same operation as in the first laser unit 141 is performed. More specifically, a degree of parallelization of the optical beam 149 is converted by the collimating lens 143 into, for example, the degree of parallelization of an almost parallel beam. The optical beam is bent in a direction at a right angle to the optical disk 132 (for example, a CD) by the rising prism 124 and focused on the recording surface of the optical disk 132 by the objective lens 144. The optical beam reflected on the recording surface of the optical disk 132 tracks back the former optical path and is photoelectrically converted by the photodetector included in the second laser unit 145. In the photodetector, an electric signal to obtain an information signal and a servo signal (focus error signal for focus control or tracking signal for tracking control) is generated.

The objective lenses 126 and 144 included in the optical system configuration 120 for BD and the optical system configuration 140 for CD and DVD are installed in an objective lens drive device (not shown) included in the optical pickup device 101, and can be moved in a focusing direction F perpendicular to the recording surfaces of the optical disks 130 to 132 and the T (tracking) direction.

Characteristic configuration parts in the optical pickup device 101 according to the embodiment having the configuration and the operation described above will be described below.

More specifically, in the first laser unit 141 and the second laser unit 145, as shown in FIG. 3, heat radiation parts 146 and 147 are attached. The heat radiation parts 146 and 147 are members which efficiently conduct heat generated from, especially, the light sources included in the first laser unit 141 and the second laser unit 145 to the base 110 of the optical pickup device 101 which is made of a metal and has a large heat capacity to remove the heat from the first laser unit 141 and the second laser unit 145.

In FIG. 1, in the optical system configuration 140 for CD and DVD, a configuration part near the first laser unit 141 including the heat radiation part 146 is shown. FIG. 1 shows a section obtained by cutting the configuration part near the first laser unit 141 shown in FIG. 2 along a line parallel to the optical axis of the laser beam 148 radiated from the first laser unit 141.

As shown in FIG. 1, or as described above, in the first laser unit 141, the metal tilt adjusting member 1421 is attached to the laser beam radiation surface 141a of the first laser unit 141 along a traveling direction of the radiated laser beam 148. Also, the metal slide adjusting member 1422 is slidably attached to the base 110 such that the slide adjusting member 1422 is in contact with the tilt adjusting member 1421. A first-end portion 146a of the L-shaped metal heat radiation part 146 is directly fixed to the heat radiation surface 141b in a state that the one-end portion 146a covers the heat radiation surface 141b having the heat radiation plate 1411 exposed to the heat radiation surface 141b of the first laser unit 141. A second-end portion 146b of the L-shaped heat radiation part 146 bent with respect to the first-end portion 146a and extending to the base 110 side along the optical axis direction of the laser beam 148 is in direct contact with the adjusting member 142. In the embodiment, the second-end portion 146b is in direct contact with the tilt adjusting member 1421 in the adjusting member 142. Heat-conductive grease can also be applied between the second-end portion 146b and the tilt adjusting member 1421 when the second-end portion 146b of the heat radiation part 146 is in contact with the tilt adjusting member 1421. The contact between the second-end portion 146b and the tilt adjusting member 1421 means a state in which the second-end portion 146b and the tilt adjusting member 1421 are in perfect contact with each other, and furthermore, a state in which the second-end portion 146b and the tilt adjusting member 1421 are almost approximated to each other.

As in the second laser unit 145 for CD in, for example, this embodiment, when the tilt adjusting member is not present, the second-end portion 146b of the heat radiation part 146 is in contact with the slide adjusting member.

As the metal for forming the heat radiation part 146, a metal having a high heat conductivity, for example, copper, aluminum, silver, or an alloy thereof can be used. The heat radiation plate 1411 may be a metal material such as zinc, magnesium, or brass which is easy to obtain and can be easily processed or molded.

In this embodiment, the tilt adjusting member 1421 and the heat radiation part 146 are configured by independent members, and the tilt adjusting member 1421 and the heat radiation part 146 may be integrally molded as one member. As described above, when the tilt adjusting member 1421 is not arranged, the slide adjusting member 1422 and the heat radiation part 146 may be integrally molded. By integrally molding the adjusting member 142 and the heat radiation part 146 as above, simplification of manufacturing of the optical pickup device and downsizing of the optical pickup device can be achieved.

As described above, the tilt adjusting member 1421 integrated with the first laser unit 141 by the heat radiation part 146 is pressed against the slide adjusting member 1422 in a rotatable state such that tilt adjustment can be performed and supported by a pressing member 112 which is configured by, for example, a leaf spring, and arranged between the heat radiation part 146 and a part 111 of the base 110 facing the heat radiation part 146. In order to smoothly perform a rotational operation for tilt adjustment in the tilt adjusting member 1421, the pressing member 112 is preferably in point contact with the heat radiation part 146. For this reason, heat radiation from the heat radiation part 146 to the part 111 of the base 110 through the pressing member 112 can be rarely expected.

The pressing member 112 is not limited to the leaf spring. The member which performs the above operation may have any configuration.

As described above, the heat radiation part 146 is arranged to conduct heat from the heat radiation surface 141b of the first laser unit 141 to the adjusting member 142, in this embodiment, the tilt adjusting member 1421, and the heat radiation part 146 is directly fixed to the heat radiation surface 141b and is brought into direct contact with the tilt adjusting member 1421. For this reason, heat generated by the first laser unit 141 is reliably and efficiently conducted to the tilt adjusting member 1421 through the heat radiation part 146. Since the tilt adjusting member 1421 and the slide adjusting member 1422 which is in contact with the tilt adjusting member 1421 and attached to the metal base 110 are both made of a metal, heat transmitted to the tilt adjusting member 1421 is reliably and efficiently conducted to the base 110 having the large heat capacity through the slide adjusting member 1422. In this manner, heat generated by the first laser unit 141 is reliably and efficiently transmitted to the base 110, and heat from the first laser unit 141 can be removed more efficiently than a conventional laser unit.

The second laser unit 145 is configured in a way similar to that of the first laser unit 141 described above. However, in the adjusting member 142, no tilt adjusting member is arranged in this embodiment. Therefore, a first-end portion of the heat radiation part 147 made of the same material as that of the heat radiation part 146 and covering the heat radiation surface of the second laser unit 145 is fixed to the heat radiation surface, and a second-end portion of the L-shaped heat radiation part 147 is brought into contact with the adjusting member 142. As shown in FIG. 2, by a leaf-spring shaped pressing member 113 such as the pressing member 112, the adjusting member 142, the second laser unit 145, and the heat radiation part 147 which are integrated with each other are pressed against the base 110 and supported.

Therefore, heat generated by the second laser unit 145 is conducted to the adjusting member 142 and then base 110 through the heat radiation part 147. Thus heat from the second laser unit 145 can be efficiently removed.

Since the heat radiation parts 146 and 147 are configured by L-shaped members, the laser units 141 and 145 serving as heat sources and the adjusting member from which heat is radiated can be connected to each other in the shortest distance. Thus, the heat radiation part 146 can be arranged in a small space. Therefore, the optical pickup device 101 can be made compact as a whole.

In FIGS. 1 to 3, the heat radiation parts 146 and 147 are schematically shown. However, the heat radiation parts 146 and 147 can employ shapes and configurations as shown in, for example, FIGS. 8A to 10J. In FIGS. 8A to 10J, peripheral portions of the heat radiation part 146 and the first laser unit 141 are exemplified. However, peripheral portions of the heat radiation part 147 and the second laser unit 145 can be configured in the same manner as described above. A configuration obtained by appropriately combining modifications (as will be described below) may also be employed.

Figure 8A:
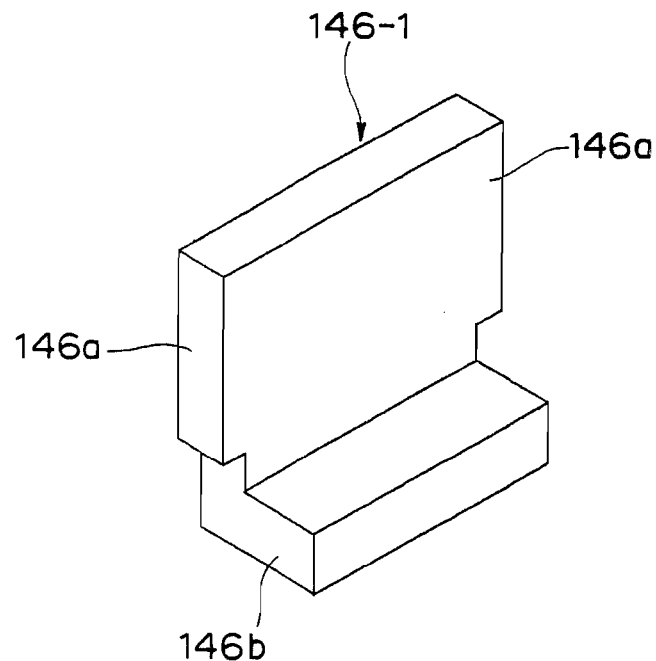
Figure 8B:
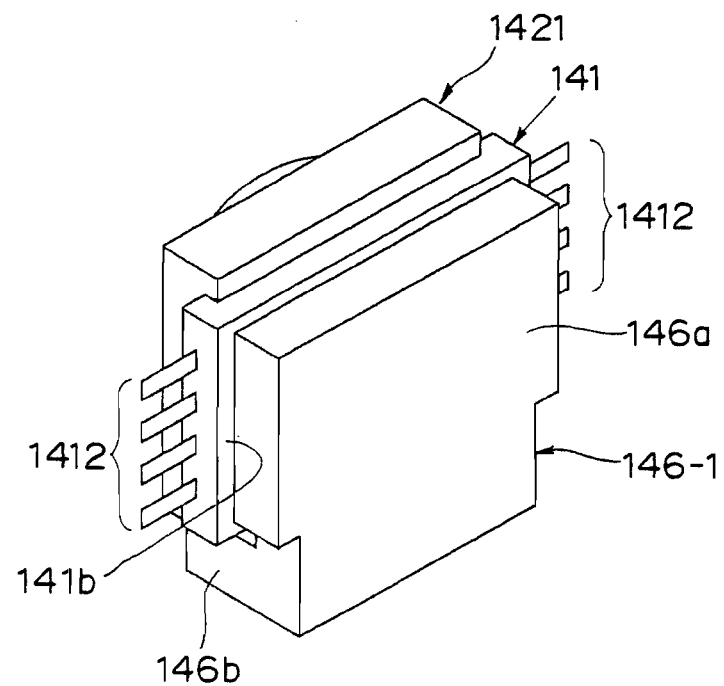
FIG. 8B is a perspective view showing a state in which the heat radiation part shown in FIG. 8A is attached to the laser unit and a tilt adjusting member.
Figure 8C:
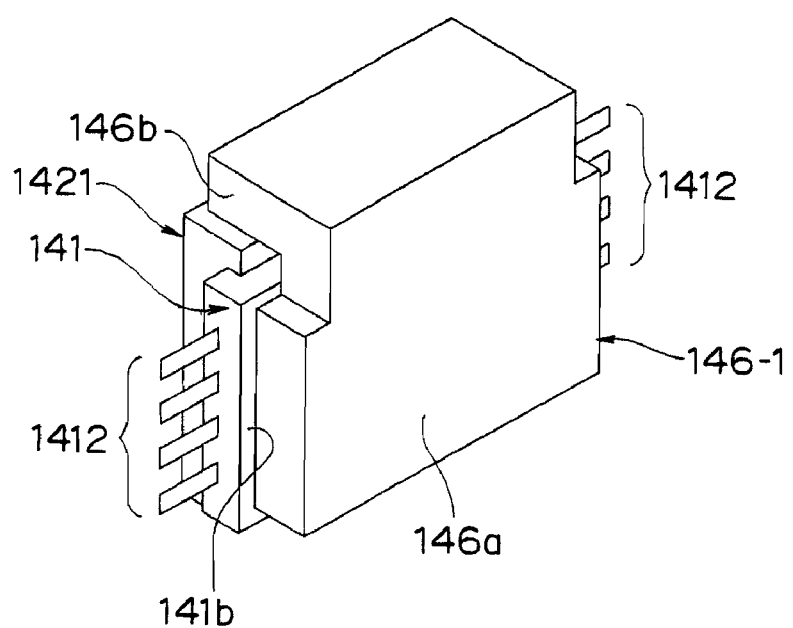
FIG. 8C is a perspective view showing a state in which the heat radiation part shown in FIG. 8A is attached to the laser unit and the tilt adjusting member.

FIG. 8A shows a heat radiation part 146-1 in which a width of the first-end portion 146 of the L-shaped heat radiation part 146 is made larger than the width of the second end portion 146b such that a contact area to the heat radiation surface 141b of the first laser unit 141 becomes large. FIGS. 8B and 8C show a state in which the heat radiation part 146-1 is attached to the first laser unit 141 and the tilt adjusting member 1421. FIG. 8B shows a state in which the heat radiation part 146-1 is attached such that the second-end end portion 146b is arranged on the lower side in the vertical direction. FIG. 8B shows a state in which the heat radiation part 146-1 is attached such that the second-end portion 146b is arranged on the upper side in the vertical direction.

The heat radiation part 146-1 has excellent heat radiation property because the contact area to the heat radiation surface 141b of the first laser unit 141 is larger than that of the heat radiation part 146.

As shown in FIGS. 8B and 8C, on the first laser unit 141, connection terminals 1412 of the light source and the photo detector are projected. Therefore, the second-end portion 146b of the heat radiation part 146-1 is arranged so as to avoid the connection terminals 1412. According to such arrangement, a notch or the like which prevents interference with the connection terminals 1412 need not be formed at the second-end portion 146b, and the heat radiation surface 141b and the tilt adjusting member 1421 can be connected to each other in the shortest distance, and the optical pickup device 101 can be made compact as a whole.

The arrangement mentioned above is also applied to the heat radiation part 146 described above and modifications (will be described below) of the heat radiation part 146.

Figure 9A:
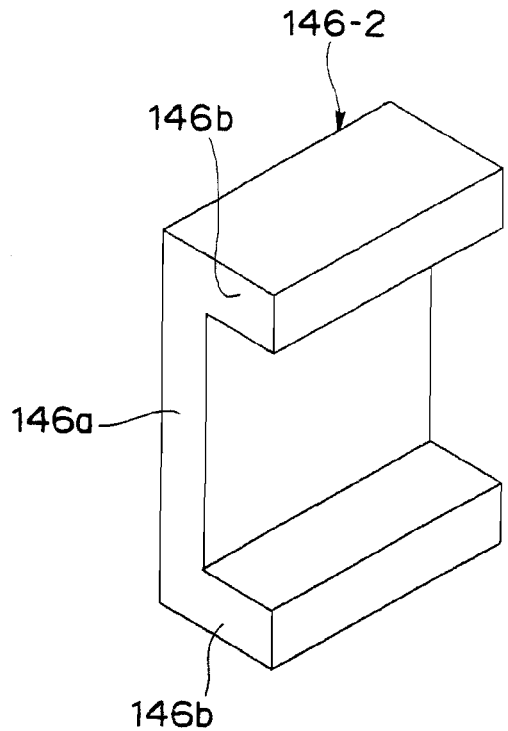
Figure 9B:
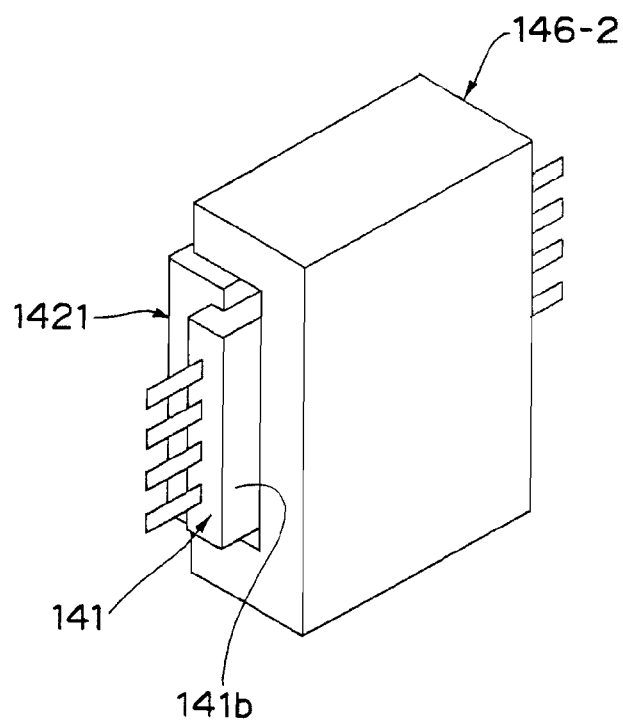
FIG. 9B is a perspective view showing a state in which the heat radiation part shown in FIG. 9A is attached to the laser unit and the tilt adjusting member.

FIG. 9A shows a C-shaped shaped heat radiation part 146-2, and FIG. 9B shows a state in which the heat radiation part 146-2 is attached to the first laser unit 141 and the tilt adjusting member 1421. Since the heat radiation part 146-2 has two portions which are in contact with the tilt adjusting member 1421, the heat radiation part 146-2 is excellent in heat radiation property more than that of the heat radiation part 146.

Figure 10A:
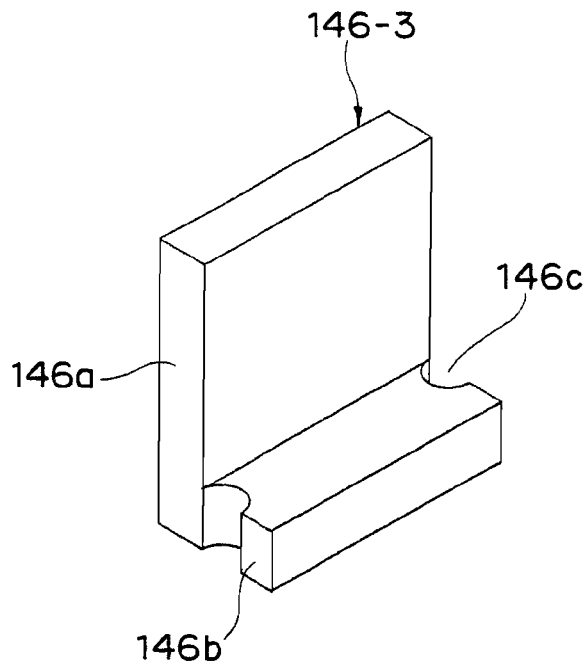
Figure 10B:
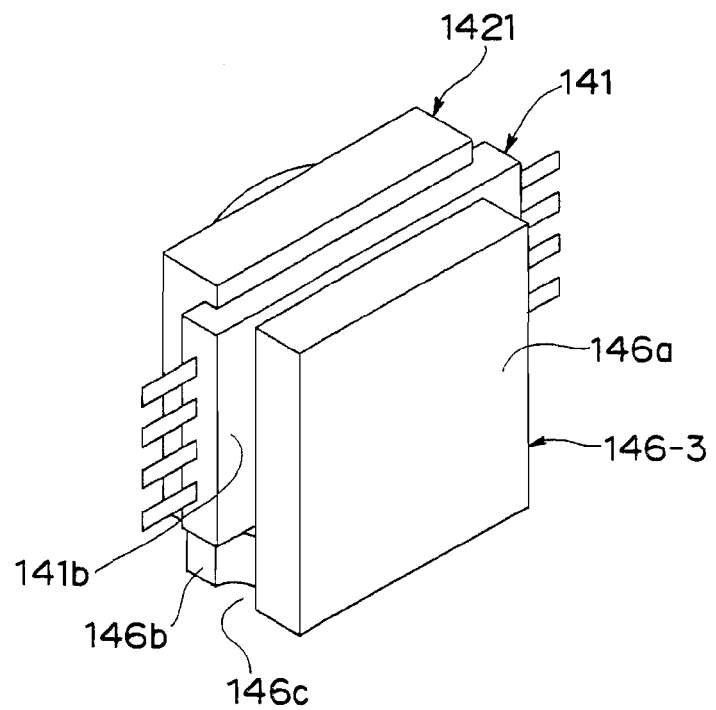
FIG. 10B is a perspective view showing a state in which the heat radiation part shown in FIG. 10A is attached to the laser unit and the tilt adjusting member.

FIG. 10A shows a heat radiation part 146-3 in which notches 146c to avoid interference with an adjusting jig are formed at both ends of the second-end portion 146b of the heat radiation part 146. Although the notch 146c is shown as a semicircular through hole, the shape of the notch 146c is not limited to a specific shape. FIG. 10B shows a state in which the heat radiation part 146-3 is attached to the first laser unit 141 and the tilt adjusting member 1421. As a matter of course, as shown in FIG. 8C, the second-end portion 146b of the heat radiation part 146-3 can also be arranged on the upper side.

As described above, in order to perform optical axis adjustment of the optical system and inclination adjustment of a light-emitting angle of the laser beam from the light source, the slide adjusting member 1422 and the tilt adjusting member 1421 have to be adjusted finely. Although the adjusting jig is used for the adjustment, the adjusting jig must be prevented from interfering with the heat radiation part, and the notches 146c in the heat radiation part 146-3 are notches to prevent the interference. Therefore, according to the heat radiation part 146-3, adjustment by the adjusting member 142 can be easily performed.

As a heat radiation part having a notch for preventing interference with the adjusting jig, for example, the following example may be adopted. These heat radiation parts can also be attached to the first laser unit 141 and the tilt adjusting member 1421 like the heat radiation part 146-3, and can achieve the same effect as that of the heat radiation part 146-3.

Figure 10C:
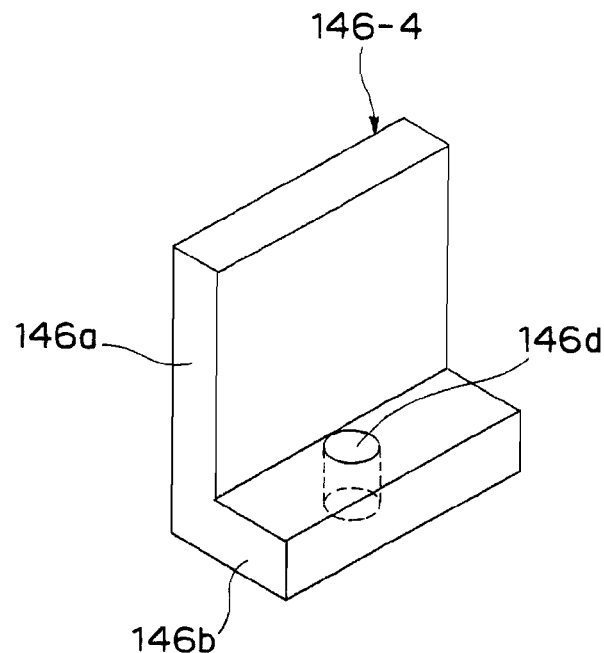
Figure 10D:
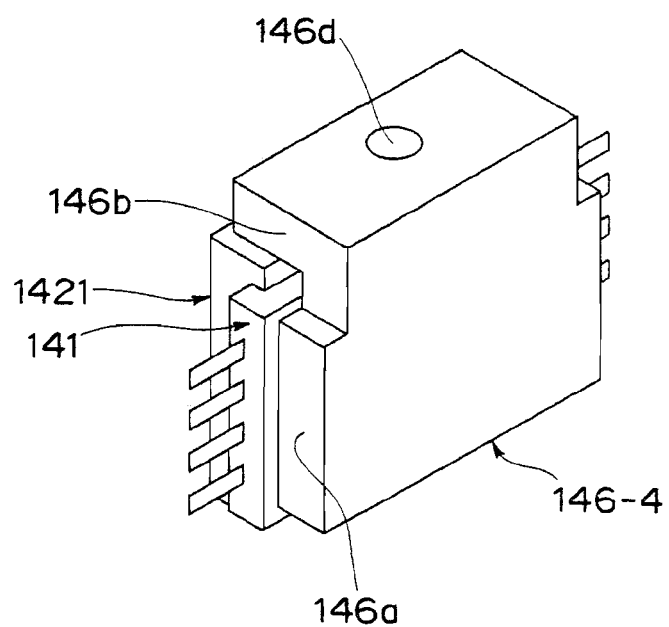
FIG. 10D is a perspective view showing a state in which the heat radiation part shown in FIG. 10C is attached to the laser unit and the tilt adjusting member.

FIG. 10C shows a heat radiation part 146-4 in which, for example, a circular hole 146d penetrating the second-end portion 146b is formed at a center portion of the second-end portion 146b of the heat radiation part 146. FIG. 10D shows a state in which the heat radiation part 146-4 is attached to the first laser unit 141 and the tilt adjusting member 1421.

Figure 10E:
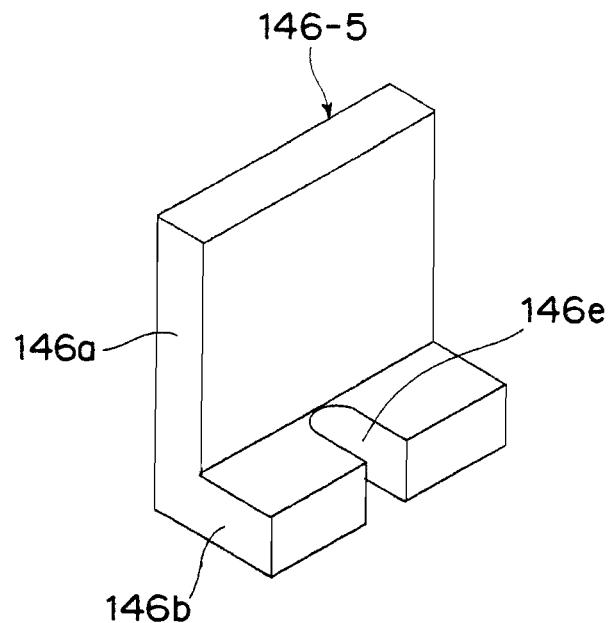
Figure 10F:
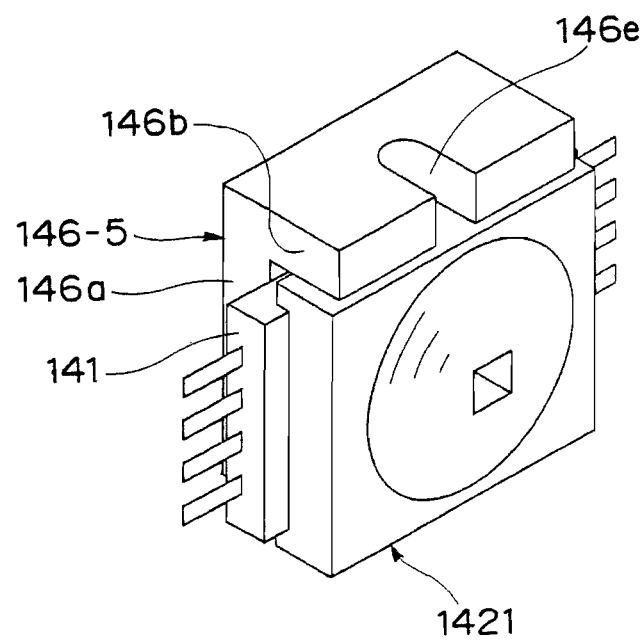
FIG. 10F is a perspective view showing a state in which the heat radiation part shown in FIG. 10E is attached to the laser unit and the tilt adjusting member.

FIG. 10E shows a heat radiation part 146-5 in which, for example, an elongate hole-shaped notch 146e obtained by notching the second-end portion 146b is formed at a center portion of the second-end portion 146b of the heat radiation part 146. FIG. 10F shows a state in which the heat radiation part 146-5 is attached to the first laser unit 141 and the tilt adjusting member 1421.

Figure 10G:
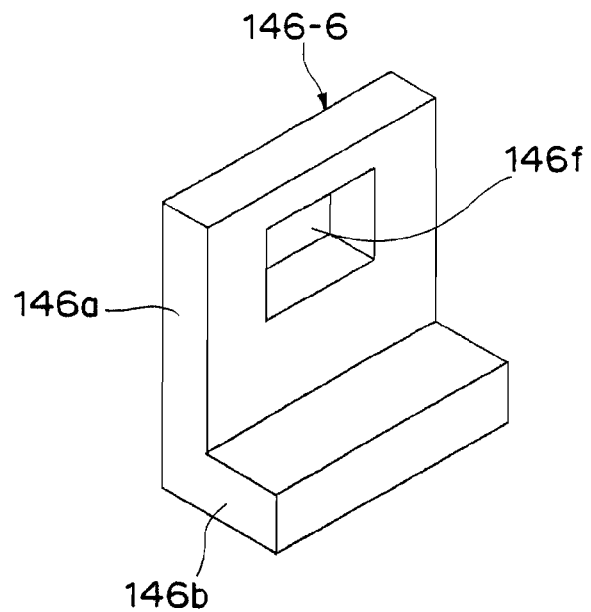
Figure 10H:
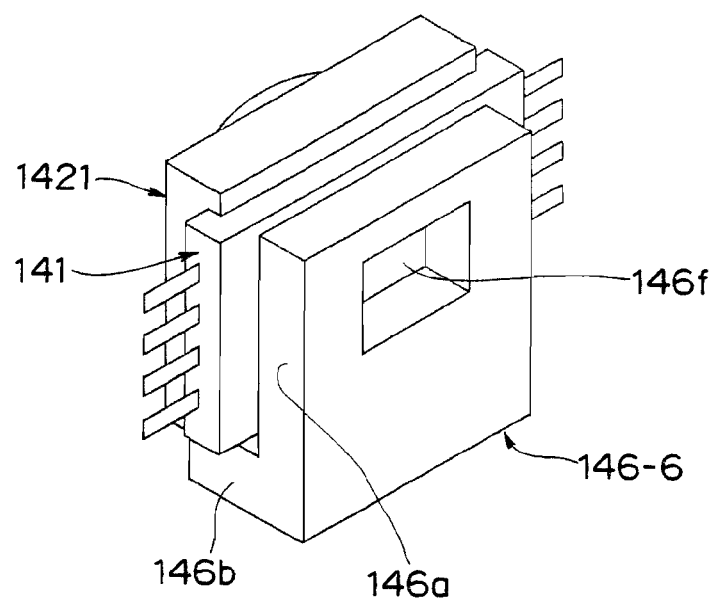
FIG. 10H is a perspective view showing a state in which the heat radiation part shown in FIG. 10G is attached to the laser unit and the tilt adjusting member.
Figure 10:
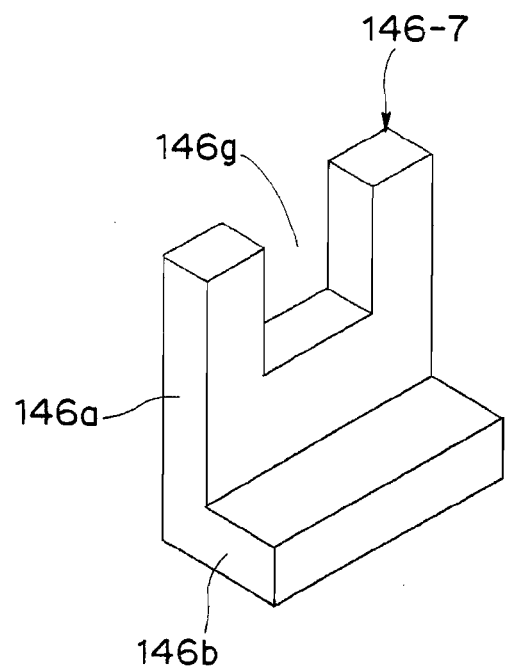

FIG. 10G shows a heat radiation part 146-6 in which, for example, a square hole 146f is formed at a center portion of the first-end portion 146a of the heat radiation part 146 to penetrate the first-end portion 146a. FIG. 10H shows a state in which the heat radiation part 146-6 is attached to the first laser unit 141 and the tilt adjusting member 1421.

Figure 10J:
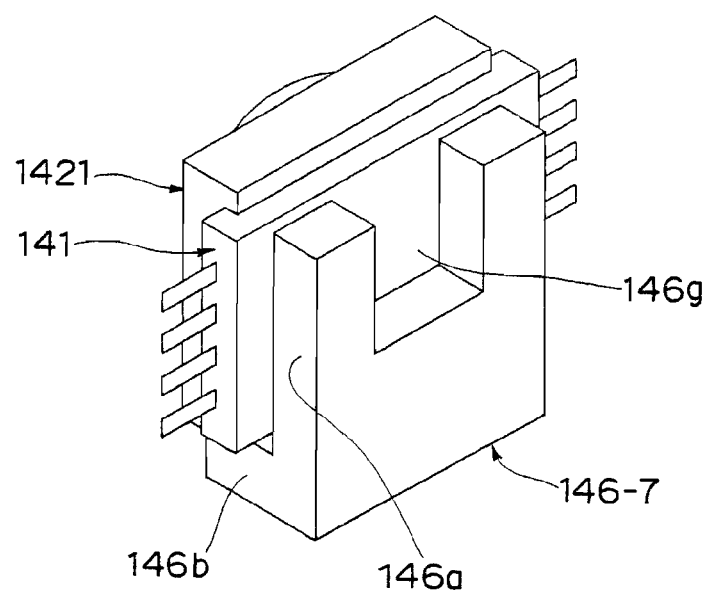
FIG. 10J is a perspective view showing a state in which the heat radiation part shown in FIG. 10I is attached to the laser unit and the tilt adjusting member.

FIG. 10I shows a heat radiation part 146-7 in which, for example, a square notch 146g obtained by notching the first-end portion 146a is formed at a center portion of the first-end portion 146a of the heat radiation part 146. FIG. 10J shows a state in which the heat radiation part 146-7 is attached to the first laser unit 141 and the tilt adjusting member 1421. Herein, in the heat radiation parts 146-6 and 149-7, the adjusting jig is used to perform fine adjustment of the first laser unit 141 through the hole 146f and the notch 146g.

With respect to the heat radiation parts described above, the typically heat radiation part 146 is exemplified. In order to further improve the heat radiation property, heat radiation grease can also be applied between the heat radiation part 146, and the first laser unit 141 and the adjusting member 142. Application of the heat radiation grease is shown in FIGS. 11A to 11E.

Also, after the adjusting process by the adjusting jig is performed, heat radiation grease can also be injected and applied to the hole 146d, the notch 146e, the hole 146f, and the notch 146g in the heat radiation parts 146-4 to 146-7 shown in FIGS. 10C to 10J.

Figure 11A:
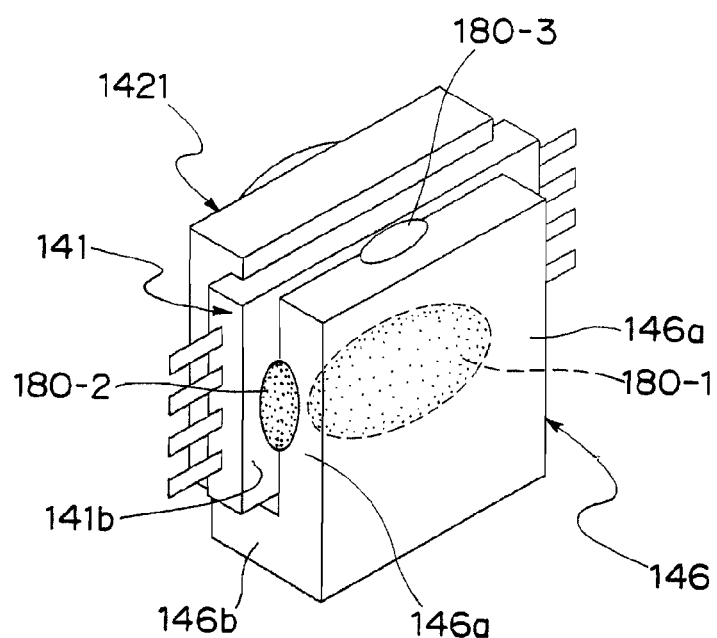
FIG. 11A is a perspective view for explaining a position where heat radiation grease is applied to a configuration part obtained by attaching the heat radiation part shown in FIG. 1 or the like to the laser unit and the tilt adjusting member.
Figure 11B:
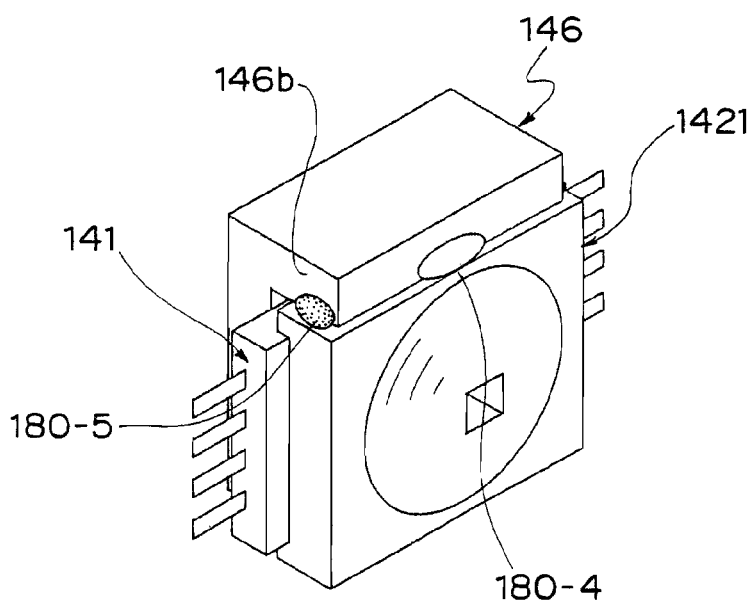
FIG. 11B is a perspective view showing a back side of the configuration portion shown in FIG. 11A.

FIG. 11A shows an example in which heat radiation grease 180-1 is applied to a contact portion between the heat radiation part 146 and the heat radiation surface 141b of the first laser unit 141, heat radiation grease 180-2 is applied so as to spread left and right end faces of the first-end portion 146a of the heat radiation part 146 and the heat radiation surface 141b, and heat radiation grease 180-3 is applied so as to spread an upper end surface of the first-end portion 146a of the heat radiation part 146 and the heat radiation surface 141b. Furthermore, as shown in FIG. 11B, an example in which heat radiation grease 180-4 and 180-5 are applied to straddle between the second-end portion 146b of the heat radiation part 146 and the tilt adjusting member 1421 is shown. However, application places are not limited to the examples shown in FIGS. 11A and 11B. At least one place of the places on which the heat radiation grease 180-1 to 180-5 (to be generally called "heat radiation grease 180") are applied, heat radiation grease 180 may be applied. The heat radiation grease 180 may be interposed at a contact surface portion between the second-end portion 146b of the heat radiation part 146 and the tilt adjusting member 1421.

Figure 11C:
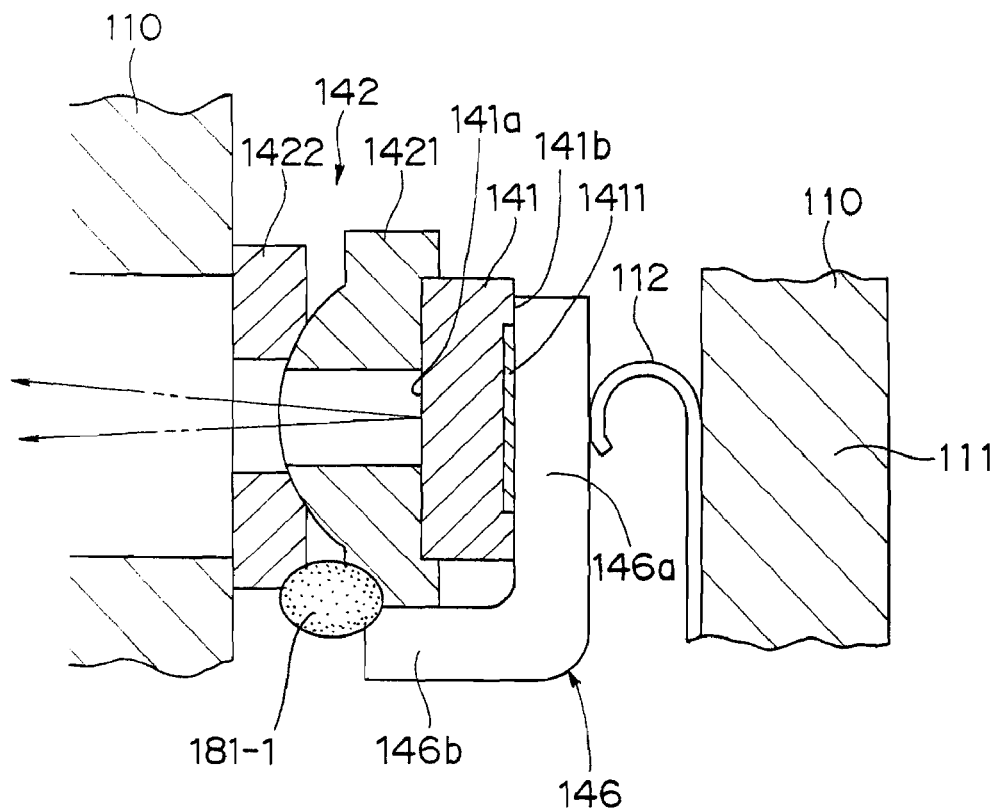
FIG. 11C is a perspective view for explaining a position where heat radiation grease is applied to a configuration part obtained by attaching the heat radiation part shown in FIG. 1 or the like to the laser unit and the tilt adjusting member.
Figure 11D:
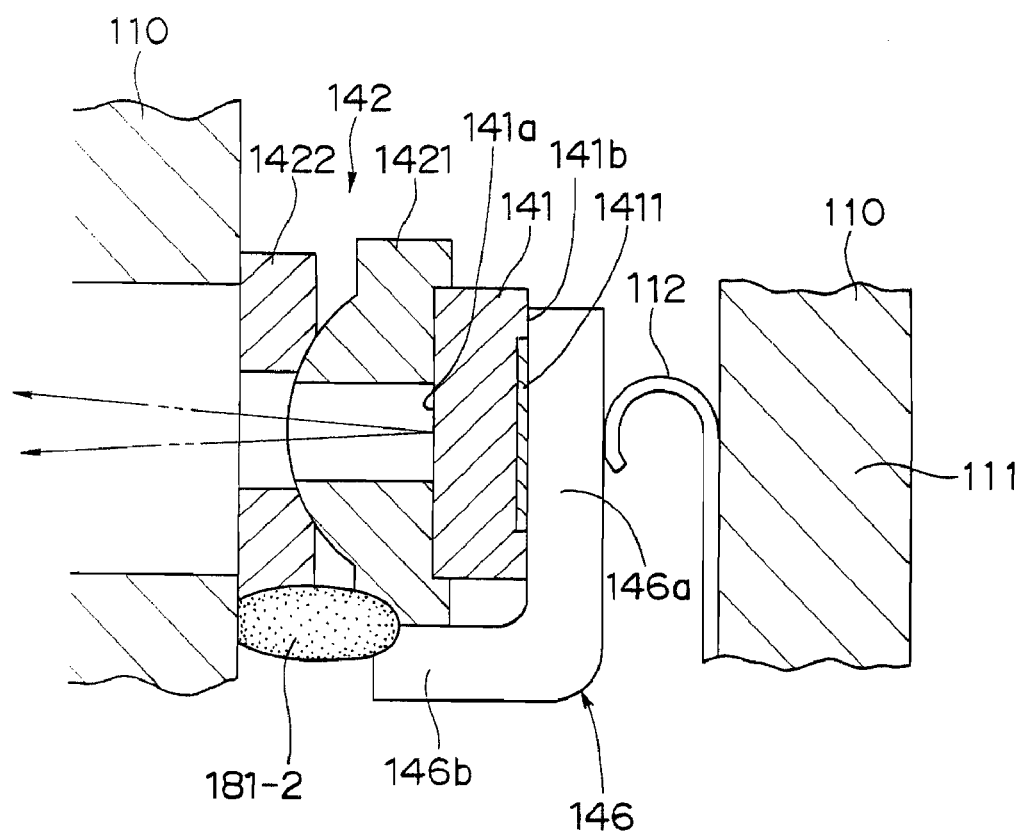
FIG. 11D is a perspective view for explaining a position where heat radiation grease is applied to a configuration part obtained by attaching the heat radiation part shown in FIG. 1 or the like to the laser unit and the tilt adjusting member.
Figure 11E:
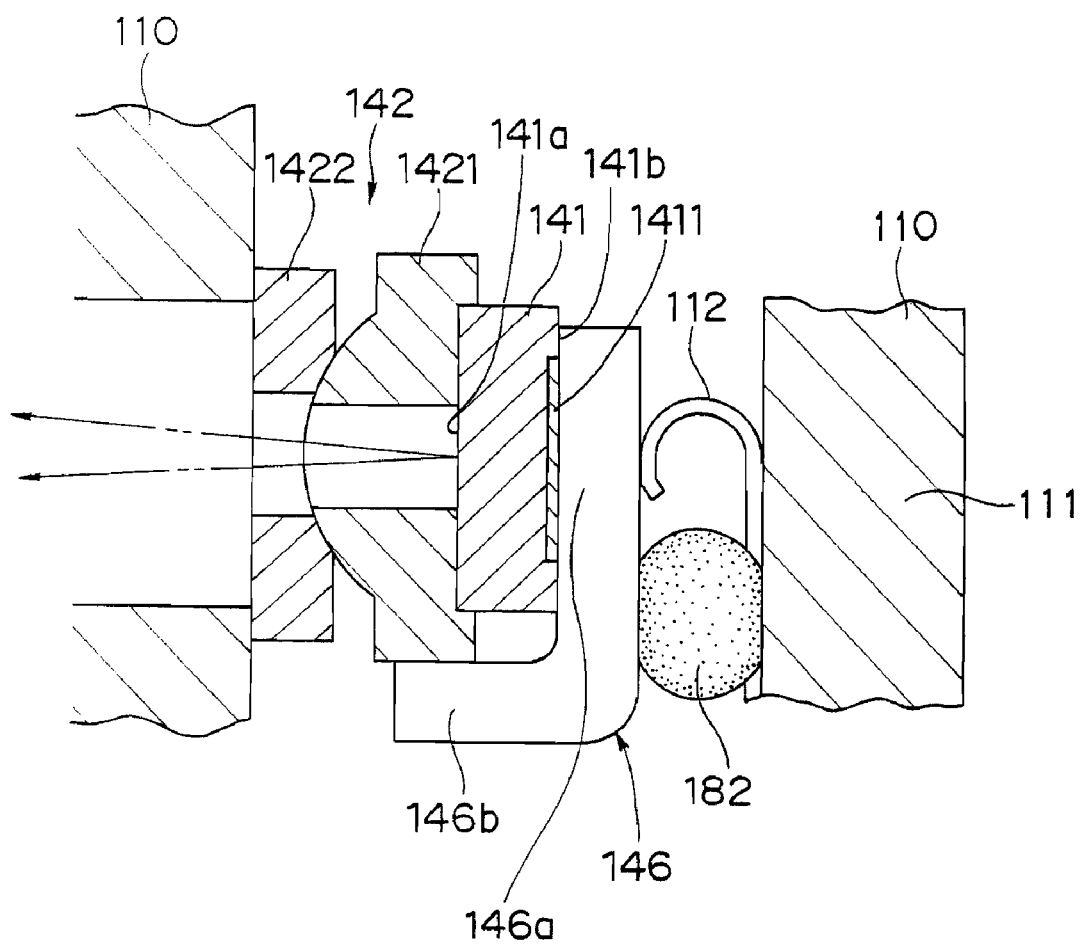
FIG. 11E is a perspective view for explaining a position where heat radiation grease is applied to a configuration part obtained by attaching the heat radiation part shown in FIG. 1 or the like to the laser unit and the tilt adjusting member.

FIG. 11C shows an example in which the heat radiation grease 181-1 is also applied so as to straddle between the tilt adjusting member 1421 and the slide adjusting member 1422. Furthermore, FIG. 11D shows an example in which heat radiation grease 181-2 is also applied so as to straddle between the slide adjusting member 1422 and the base 110. As shown in FIG. 11E, heat radiation grease 182 can also be applied between the first-end portion 146a of the heat radiation part 146 and the part 111 of the base 110 facing the first-end portion 146a. As a matter of course, configurations obtained by appropriately combining the configurations shown in FIGS. 11C to 11E and the configurations shown in FIGS. 11A to 11B can also be employed.

The heat radiation part 146 out of the configurations in the various heat radiation parts described above is taken as an example, and a graph of a change in temperature on the heat radiation surface 141b of the first laser unit 141 is shown in FIG. 12. In FIG. 12, an explanatory note "L type" corresponds to the heat radiation part 146, and an explanatory note "straight type" corresponds to a planar heat radiation plate (not shown) which is brought into contact with only the heat radiation surface 141b of the first laser unit 141. Also, a description "+grease" in the explanatory notes indicates a case in which heat radiation grease is applied to the L-type or straight-type heat radiation part.

As is apparent from FIG. 12, the configuration to which the heat radiation part 146 is attached and to which the heat radiation grease is applied to the heat radiation part 146 has the best heat radiation property, and the configuration has heat radiation property which is more preferred than that of the configuration in which grease is applied to the straight-type heat radiation part. For this reason, the L-shaped configuration effectively contributes to the heat radiation property.

In this embodiment, both the tilt adjusting member 1421 and the slide adjusting member 1422 are made of the metal material. However, for example, the slide adjusting member 1422 can also be made of a resin material such as PPS (polyphenylene sulfide). In such configuration, sliding between contact surfaces of the metal and the resin, not between the metal and metal, is obtained when tilt adjustment or slide adjustment is performed. For this reason, smooth adjustment can be achieved, or a configuration member of the tilt adjusting member 1421 and the slide adjusting member 1422 can be effectively reduced in weight by using the resin material. Also in the configuration, since the tilt adjusting member 1421 is made of the metal member, use of the L-shaped heat radiation part is effective to improve heat removal from a view point of increasing the heat capacity of the member related to exhausting of heat. Further, in order to reduce the optical pickup device in weight, even though the base 110 is formed by a resin material, similarly, use of the L-shaped heat radiation part is effective to improve heat removal from a view point of increasing the heat capacity of the member related to exhausting of heat because the tilt adjusting member 1421 is made of the metal member.

As described above, in the optical system configuration 120 for BD shown in FIG. 2, at the present time, a laser unit obtained by integrally molding a laser beam source and a photodetector with a resin material has not been commercialized. Therefore, heat of the light source portion can be relatively easily removed in the present manufactured goods. However, in the future, even in the optical system configuration for BD, when a laser unit obtained by integrally molding a laser beam source and a photodetector with a resin material would be commercialized, the configuration of the heat radiation part 146 in the embodiment described above can be employed.

In the optical pickup device 101 shown in FIGS. 2 and 3, the light source having the semiconductor laser element which radiates the red laser beam with the wavelength of, for example 680 nm for DVD included in the first laser unit 141 and the light source having the semiconductor laser element which radiates the infrared laser beam with the wavelength of, for example, 780 nm for CD included in the second laser unit 145 are independently configured. However, in the future, when a light source which can radiate beams of a plurality of types with a plurality of wavelengths from one light source would be developed, the present invention can also be applied to such the new light source. Furthermore, the present invention can also be applied to a pickup apparatus obtained by integrating the new light source and the optical system for BD.

Furthermore, the optical pickup device 101 described above has the configuration as described above in which the heat radiation part 146 which can have the various variations is attached to the arrangement in which the adjusting member 142 is disposed between the first laser unit 141 and the base 110. The first laser unit 141 and the adjusting member 142 are pressed from the back of the first laser unit 141 toward the base 110 by the pressing member 112. However, the arrangement of the heat radiation part is not limited to such configuration. More specifically, in a configuration including no adjusting member, the pressing operation by the pressing member 112 is not necessary, and thus the pressing member 112 is not necessary. With this configuration, in order to perform heat radiation from the heat radiation surface 141b of the first laser unit 141, as shown in FIGS. 13A to 13D, a configuration in which a heat radiation part is arranged in the arrangement in which the first laser unit 141 is directly attached to the base 110 is effective. In the configurations shown in FIGS. 13A to 13D, a member corresponding to the heat radiation part serves as a heat radiation fixing member.

Figure 13A:
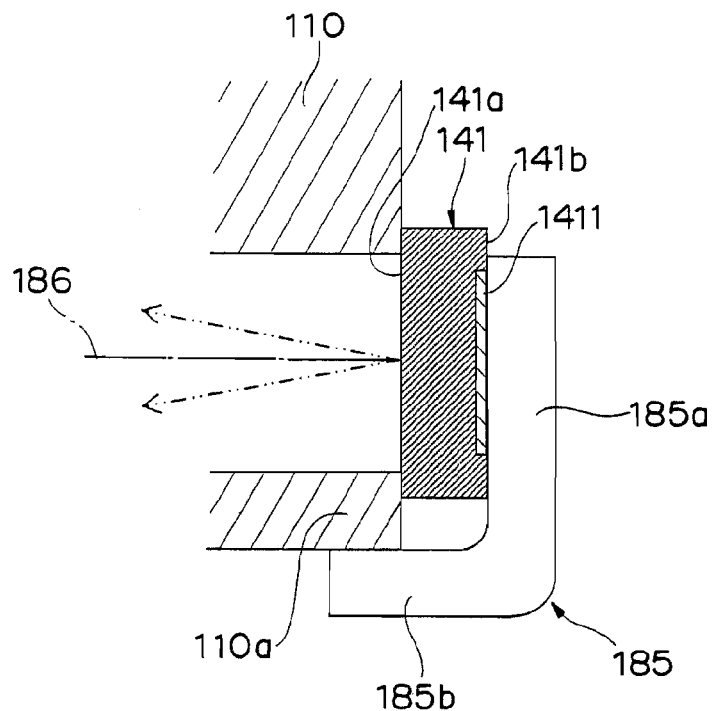
FIG. 13A is a sectional view showing another configuration of a laser unit portion included in the optical pickup device according to the embodiment of the present invention.

In FIG. 13A, the first laser unit 141 is arranged such that the heat radiation surface 141b faces the outside of the base 110, and the first laser unit 141 is fixed to the base 110 by a heat radiation fixing member 185. The heat radiation fixing member 185 is a member which fixes the first laser unit 141 to the base 110 and conducts heat from the heat radiation surface 141b to the base 110, and has a heat radiation surface fixing portion 185a and a base fixing portion 185b which are integrally formed. The heat radiation surface fixing portion 185a is a portion fixed to the heat radiation surface 141b, and the base fixing portion 185b is a portion which is bent with respect to the heat radiation surface fixing portion 185a toward the optical axis direction of the laser beam radiated from the laser beam source of the first laser unit 141, extends to the base 110, and is fixed to the base 110.

The heat radiation fixing member 185, as described above, can fix the first laser unit 141 to the base 110 and can conduct heat from the heat radiation surface 141b of the first laser unit 141 to the base 110 effectively. Since the base fixing portion 185b is shaped to be bent with respect to the heat radiation surface fixing portion 185a and to extend to the base 110, i.e., the heat radiation fixing member 185 has an L shape, fixing of the first laser unit 141 having the heat radiation surface 141b on the back to the base 110 and heat radiation can be performed with a compact configuration.

Figure 13B:
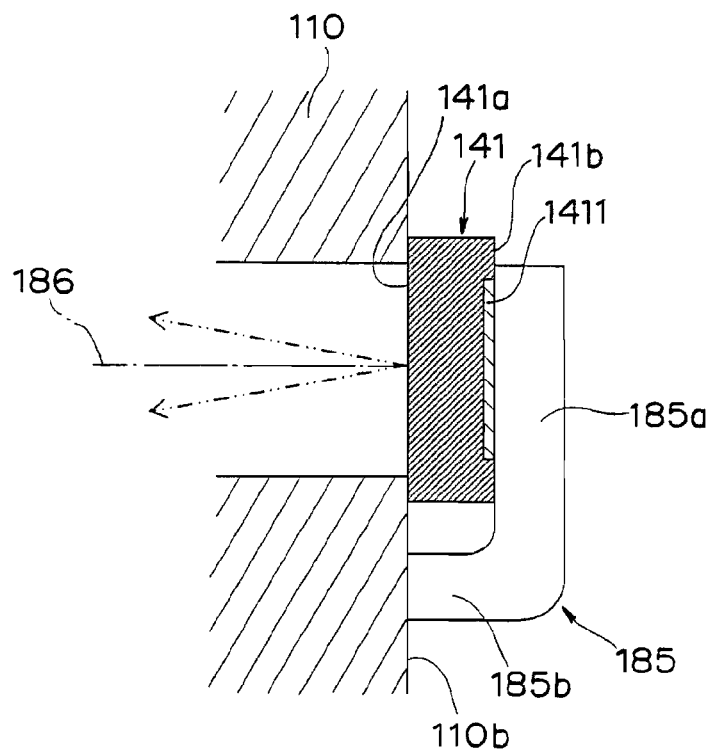
FIG. 13B is a sectional view showing a modification of the configuration shown in FIG. 13A.
Figure 13C:
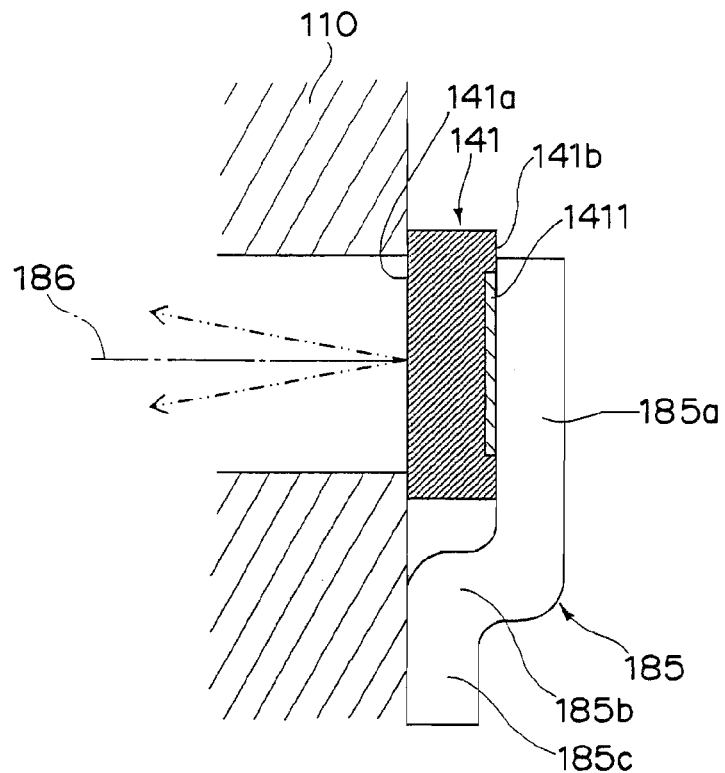
FIG. 13C is a sectional view showing a modification of the configuration shown in FIG. 13B.

In FIG. 13A, although the base 110 has a leg portion 110a which makes fixing of the heat radiation surface fixing portion 185a easy, the heat radiation fixing member 185 can also be attached to the base 110 which is free from the leg portion 110a. For example, as shown in FIG. 13B, a configuration in which an end portion of the base fixing portion 185b is brought into contact with a side surface 110b of the base 110 and fixed can also be employed. As shown in FIG. 13C, a configuration having a bent extending portion 185c obtained by bending the base fixing portion 185b along the side surface 110b of the base 110 can also be employed.

Even in the configuration shown in FIGS. 13B and 13C, the heat radiation fixing member 185 can efficiently conduct heat of the first laser unit 141 from the heat radiation surface 141b of the first laser unit 141 to the base 110. Also, the configuration can perform the fixing of the first laser unit 141 to the base 110 and heat radiation with a compact configuration.

Figure 13D:
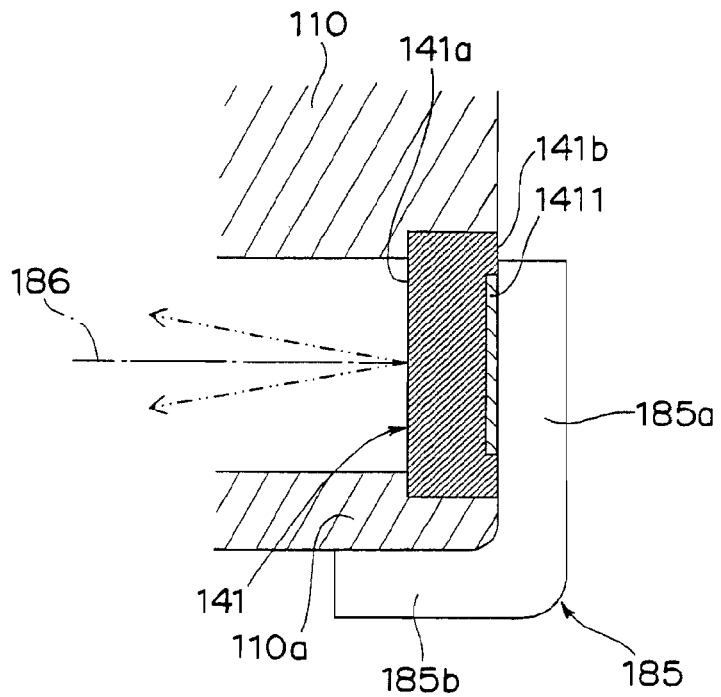
FIG. 13D is a sectional view showing a modification of the configuration shown in FIG. 13A.
Figure 14:
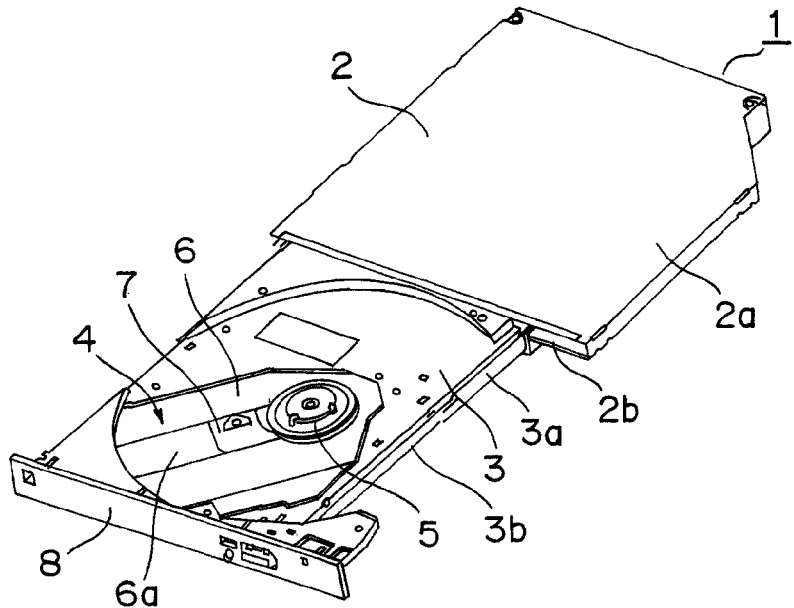
FIG. 14 is a perspective view showing a conventional optical disk apparatus.

As shown in FIG. 13D, a configuration in which the first laser unit 141 is completely embedded in the base 110 or imperfectly embedded in the base 110 to attach the heat radiation fixing member 185 may also be employed. In this configuration, the heat radiation fixing member 185 can efficiently conduct heat of the first laser unit 141 from the heat radiation surface 141b of the first laser unit 141 to the base 110. Also in this configuration, since a contact area between the first laser unit 141 and the base 110 is larger than that in FIG. 13A or the like, heat radiation efficiency can be further improved.

The heat radiation grease described above can also be applied to the configuration having the heat radiation surface fixing member 185.

The optical pickup device 101 configured as described above, for example, as shown in FIG. 4, can be included in the optical disk apparatus 150 having a control circuit 151. The control circuit 151 receives a signal obtained from the optical pickup device 101 and performs, on the basis of the signal, rotational control of the optical disks 130 to 132 and focusing and tracking control for the optical lens.

According to the optical disk apparatus 150, as described above, the optical pickup device 101 has the optical system configuration 120 for BD and the optical system configuration 140 for CD and DVD. For this reason, the optical disk apparatus 150 can advantageously perform information processing corresponding to a plurality of optical disks having different recording densities.

Figure 5:
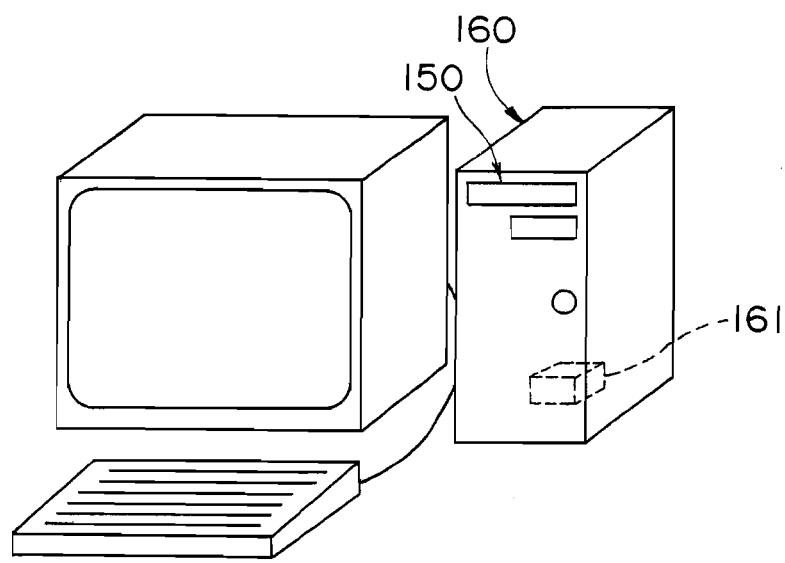
FIG. 5 is a perspective view showing a computer configuration serving as an example of the configuration including the optical disk apparatus shown in FIG. 4.
Figure 6:
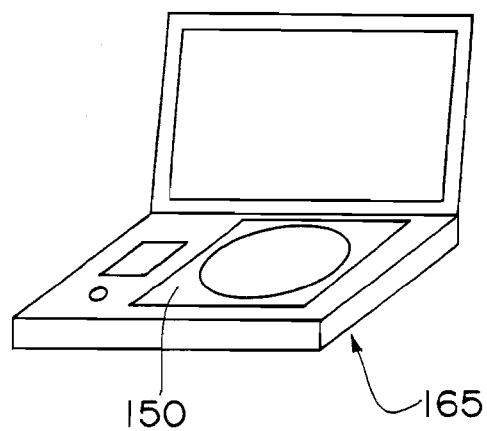
FIG. 6 is a perspective view showing an optical disk player configuration serving as an example of a configuration including the optical disk apparatus shown in FIG. 4.
Figure 7:
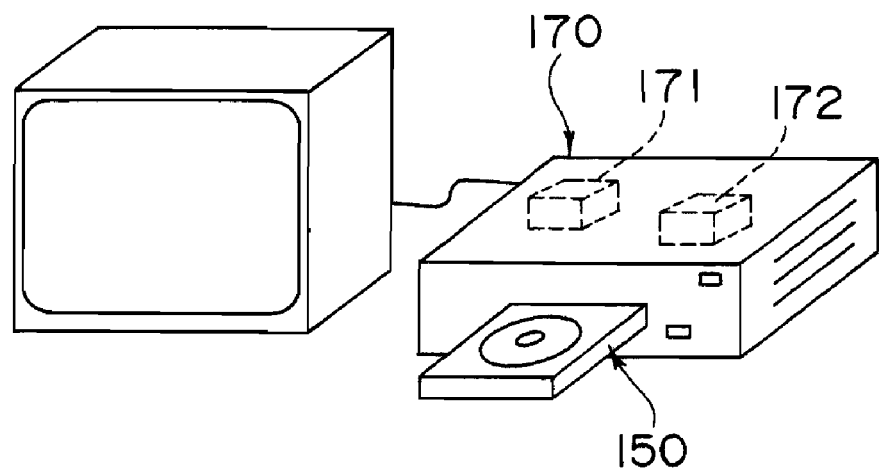
FIG. 7 is a perspective view showing an optical disk recorder configuration serving as an example of the configuration including the optical disk apparatus shown in FIG. 4.

Furthermore, a computer 160 shown in FIG. 5, an optical disk player 165 shown in FIG. 6, and an optical disk recorder 170 shown in FIG. 7 each of which includes the optical disk apparatus 150 can be configured. Since each of these apparatuses has the optical pickup device 101, these apparatuses can stably perform recording and reproducing to optical disks of different types. Therefore, the apparatuses advantageously have a wide array of uses.

In FIG. 5, reference numeral 161 denotes an operational device such as a central processing unit (CPU). When the computer 160 has a cable or wireless input/output terminal, the computer can exchange information with a network, i.e., a plurality of apparatuses, for example, computers, telephones, TV tuners, and the like and can also be used as an information server (optical disk server) shared by the plurality of apparatuses.

The optical disk player 165 can be configured as a conversion apparatus which converts an information signal obtained from the optical disk apparatus 150 into an image, for example, an optical disk player having a decoder. Furthermore, the optical disk player 165 can also be used as, for example, an automobile navigation system, and can also employ a configuration to which a display device such as a liquid crystal monitor is added.

When the optical disk recorder 170 includes a conversion apparatus, for example, an encoder 171 which converts image information into information to be recorded on the optical disk by the optical disk apparatus 150 and further includes a conversion apparatus, for example, a decoder 172 which converts an information signal obtained from the optical disk apparatus 150 into an image, the optical disk recorder 170 can also reproduce a recorded portion. The optical disk recorder 170 may include an output device such as a cathode-ray tube or a liquid crystal display which displays information, or a printer.

As described above, the optical disk apparatus 150 can perform the recording and reproducing to the optical disks of a plurality of types having different base material thicknesses, different corresponding wavelengths, different recording densities, and the like. Furthermore, a compatible optical information apparatus using the optical disk apparatus 150 can handle the optical disks of many standards such as the CD, DVD, and BD. Therefore, the optical disk apparatus 150 can be applied to and developed for all systems which accumulate information such as a computer, an optical disk player, an optical disk recorder, an automobile navigation system, an editing system, a data server, an AV component, and the like.

It is to be noted that, by properly combining the arbitrary embodiments of the aforementioned various embodiments, the effects possessed by them can be produced.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

The entire disclosure of Japanese Patent Application No. 2006-052726 filed on Feb. 28, 2006, including specification, claims, and drawings, is incorporated herein by reference in its entirety.

The present invention can be applied to an optical pickup device included in an optical disk apparatus which records and reproduces information on/from an optical disk such as a CD, a DVD, and the like, and an optical disk apparatus including the optical pickup device.

The invention claimed is:

1. An optical pickup device which has: a base; a laser unit having a laser beam source arranged on the base; an optical system which is disposed on the base and propagates a laser beam between the laser unit and an optical disk; and an adjusting member which is disposed between the base and the laser unit, is configured to support the laser unit movably in fine movement with respect to the base, and is configured to adjust the laser beam radiated from the laser unit to the optical disk, the device further comprising a heat radiation part configured to come in direct contact with a heat radiation surface facing a laser beam radiation surface of the laser unit and the adjusting member, and configured to conduct heat from the heat radiation surface to the adjusting member, the heat radiation part having an L-shape, and having a first-end portion configured to be fixed to the heat radiation surface and a second-end portion configured to come in contact with the adjusting member.

2. The optical pickup device according to claim 1, wherein the optical system has an objective lens configured to focus the laser beam on the optical disk, the adjusting member has a slide adjusting member configured to make the laser unit movable to adjust an optical axis of the optical system and a tilt adjusting member configured to perform tilt adjustment, and the heat radiation part comes in direct contact with the tilt adjusting member.

3. The optical pickup device according to claim 2, wherein the heat radiation part is molded integrally with the tilt adjusting member.

4. The optical pickup device according to claim 1, wherein the base, the heat radiation part, and the adjusting member are made of metal.

5. An optical disk apparatus comprising:

an optical pickup device which has: a base; a laser unit having a laser beam source arranged on the base; an optical system which is disposed on the base and propagates a laser beam between the laser unit and an optical disk; an adjusting member which is disposed between the base and the laser unit, is configured to support the laser unit movably in fine movement with respect to the base, and is configured to adjust the laser beam radiated from the laser unit to the optical disk; and a heat radiation part configured to come in direct contact with a heat radiation surface facing a laser beam radiation surface of the laser unit and the adjusting member, and configured to conduct heat from the heat radiation surface to the adjusting member, the heat radiation part having an L-shape, and having a first-end portion configured to be fixed to the heat radiation surface and a second-end portion configured to come in contact with the adjusting member; and a control circuit to which a signal obtained from the optical pickup device is supplied and configured to perform rotational control of the optical disk and focusing and tracking control of an optical lens on a basis of the signal.

* * * * *